(12) United States Patent
Ozaki et al.

(10) Patent No.: US 7,762,128 B2
(45) Date of Patent: Jul. 27, 2010

(54) WHEEL SUPPORT BEARING ASSEMBLY EQUIPPED WITH SENSOR

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 134 days.

(21) Appl. No.: 12/224,802

(22) PCT Filed: Mar. 8, 2007

(86) PCT No.: PCT/JP2007/000184
§ 371 (c)(1),
(2), (4) Date: Sep. 5, 2008

(87) PCT Pub. No.: WO2007/105367
PCT Pub. Date: Sep. 20, 2007

(65) Prior Publication Data
US 2009/0114004 A1    May 7, 2009

(30) Foreign Application Priority Data
Mar. 8, 2006    (JP)  .............................. 2006-062251
Aug. 24, 2006    (JP)  .............................. 2006-227656

(51) Int. Cl.
*G01M 17/013*    (2006.01)
(52) U.S. Cl. .................... 73/117.01; 73/115.07
(58) Field of Classification Search .............. 73/114.81, 73/115.07, 117.01
See application file for complete search history.

(56) References Cited

U.S. PATENT DOCUMENTS

| | | | | |
|---|---|---|---|---|
| 6,971,799 B2 * | 12/2005 | Sato et al. ................... | 384/448 |
| 7,178,413 B2 * | 2/2007 | Hofmann et al. ........ | 73/862.541 |
| 7,249,528 B2 * | 7/2007 | Inoue ..................... | 73/862.392 |
| 7,604,413 B2 * | 10/2009 | Koike et al. ................. | 384/448 |
| 7,628,540 B2 * | 12/2009 | Iwamoto et al. ............. | 384/448 |

(Continued)

FOREIGN PATENT DOCUMENTS

JP    2003-530565    10/2003

(Continued)

OTHER PUBLICATIONS

International Search Report of International Application PCT/JP2007/000184 (mailed May 15, 2007).

(Continued)

*Primary Examiner*—Lisa M Caputo
*Assistant Examiner*—Freddie Kirkland, III

(57) ABSTRACT

In a wheel support bearing assembly including a plurality of rolling elements (5) interposed between an outer member (1) and an inner member (2), a sensor unit (21) is fitted to one of the outer member and the inner member, which serves as a stationary member. The sensor unit includes a sensor mounting member (22) and a strain sensor (23) fitted to the sensor mounting member. The sensor mounting member has a plurality of contact fixing portions (22a, 22b) that are fixed to at least two locations spaced a distant from each other in a direction circumferentially of the outer member. A cutout (24) is provided in the outer member at respective positions corresponding to the neighboring contact fixing portions of the sensor mounting member, so as to extend in an axial direction. The strain sensor is arranged intermediate between the neighboring contact fixing portions.

10 Claims, 17 Drawing Sheets

U.S. PATENT DOCUMENTS

| | | | |
|---|---|---|---|
| 7,631,553 B2 * | 12/2009 | Heim et al. | 73/115.07 |
| 2003/0218548 A1 | 11/2003 | Sato et al. | |
| 2005/0016296 A1 | 1/2005 | Inoue | |
| 2009/0038414 A1 * | 2/2009 | Ozaki et al. | 73/862.381 |
| 2009/0097791 A1 * | 4/2009 | Ozaki et al. | 384/448 |
| 2009/0199660 A1 * | 8/2009 | Ozaki et al. | 73/862.381 |
| 2009/0229379 A1 * | 9/2009 | Ozaki et al. | 73/862.69 |
| 2009/0301222 A1 * | 12/2009 | Takahashi et al. | 73/862.044 |
| 2009/0324152 A1 * | 12/2009 | Ozaki et al. | 384/448 |
| 2010/0046871 A1 * | 2/2010 | Norimatsu et al. | 384/448 |

FOREIGN PATENT DOCUMENTS

| | | |
|---|---|---|
| JP | 2003-336653 | 11/2003 |
| JP | 2004-3601 | 1/2004 |
| JP | 2007-71280 | 3/2007 |
| WO | 01/77634 A2 | 10/2001 |

OTHER PUBLICATIONS

U.S. Appl. No. 11/990,071, filed Feb. 6, 2008, Takayoshi Ozaki et al., NTN Corporation.

U.S. Appl. No. 12/086,089, filed Jun. 5, 2008, Takayoshi Ozaki, et al., NTN Corporation.

U.S. Appl. No. 12/224,846, filed Sep. 8, 2008, Takayoshi Ozaki, et al., NTN Corporation.

English Translation of International Preliminary Report on Patentability mailed on Sep. 18, 2008 and issued in corresponding International Patent Application No. PCT/JP2007/000184.

* cited by examiner

WHEEL SUPPORT BEARING ASSEMBLY EQUIPPED WITH SENSOR

CROSS REFERENCE TO RELATED PATENT APPLICATIONS

This application claims the benefit under 35 U.S.C. Section 371 of International Application No. PCT/JP2007/000184, filed Mar. 8, 2007, which claimed priority to Japanese Application No. 2006-062251, filed Mar. 8, 2006, and Japanese Application No. 2006-227656, filed Aug. 24, 2006, in the Japanese Patent Office, the disclosures of which are hereby incorporated by reference.

BACKGROUND OF THE INVENTION

The present invention relates to a sensor incorporated wheel support bearing assembly having a load sensor built therein for detecting a load imposed on a bearing unit of a vehicle wheel.

DESCRIPTION OF THE PRIOR ART

For safety travel of an automotive vehicle, the wheel support bearing assembly has hitherto been well known in the art, which is equipped with a sensor for detecting the rotational speed of one of automotive wheels. While the automobile traveling safety precaution is generally taken by detecting the rotational speed of a vehicle wheel of various parts, it is not sufficient with only the rotational speed of the wheel and, therefore, it is desired to achieve a control for safety purpose with the use of other sensor signals.

In view of the above, it may be contemplated to achieve the vehicle attitude control based on a load acting on each of the wheels during travel of an automotive vehicle. By way of example, a large load acts on the outside wheels during the cornering, on the wheels on one side during the run along left and right inclined road surfaces or on the front wheels during the braking, and, thus, an equal load does not act on each of the vehicle wheels. Also, even in the case of the uneven live load, the loads acting on those wheel tend to become uneven. For this reason, if the loads acting on the wheels can be detected as needed, suspension systems for the vehicle wheels can be controlled beforehand based on results of detection of the loads so that the attitude control of the automotive vehicle during the traveling thereof (for example, prevention of a rolling motion during the cornering, prevention of diving of the front wheels during the braking, and prevention of diving of the vehicle wheels brought about by an uneven distribution of live loads) can be accomplished. However, no space for installation of the load sensor for detecting the load acting on the respective vehicle wheel is available and, therefore, the attitude control through the detection of the load can hardly be realized.

Also, in the event in the near future the steer-by-wire is introduced and the system, in which the wheel axle and the steering come not to be coupled mechanically with each other, is increasingly used, information on the road surface comes to be required to transmit to the steering wheel by detecting a wheel axis direction load.

In order to meet those needs hitherto recognized, the provision of a strain gauge for detecting a strain on an outer ring of the wheel support bearing assembly has been suggested. (See, for example, the Patent Document 1 quoted below.)

[Patent Document 1] JP Published Int'l Application No. 2003-530565

An outer ring of the wheel support bearing assembly is a bearing component part having a rolling surface defined therein and required to have a strength, which bearing component part is manufactured through complicated process steps including, for example, a plastic forming, a turning process, a heat treatment and a grinding process. Accordingly, where a strain gauge is attached to the outer ring such as disclosed in the Patent Document 1 referred to above, there is a problem in that the productivity is low and the cost of manufacture thereof during a mass production tends to become high. Also, it is not easy to detect a strain occurring in the outer ring with high sensitivity and, when a result of such detection is utilized in controlling the vehicle attitude of an automotive vehicle then travelling, a problem will arise in association with the accuracy of the control.

SUMMARY OF THE INVENTION

In view of the above, an object of the present invention is to provide a sensor incorporated wheel support bearing assembly, in which the sensor for detecting the load can be snugly and neatly installed in an automotive vehicle, the load acting on the vehicle wheel can be detected with high sensitivity and the cost of manufacture can be reduced during a mass production.

The sensor incorporated wheel support bearing assembly of the present invention is a wheel support bearing assembly for rotatably supporting a vehicle wheel relative to an automotive body structure and includes an outer member having an inner periphery formed with double row rolling surfaces defined therein, an inner member formed with rolling surfaces in face-to-face relation with the rolling surfaces in the outer member, a plurality of rows of rolling elements interposed between those rolling surfaces and a sensor unit mounted on one of the outer member and the inner member, which is a stationary member. The sensor unit includes a sensor mounting member and a strain sensor fitted to this sensor mounting member. The sensor mounting member has a plurality of contact fixing portions that are fixed to at least two locations spaced from each other in a direction circumferentially of the stationary member. A cutout is provided in the stationary member at least one location, corresponding to an intermediate portion between the plural neighboring contact fixing portions of the sensor mounting member, so as to extend in a direction axially thereof. The strain sensor is arranged at least one location intermediate between the neighboring contact fixing portions. The cutout referred to above is used to lower the rigidity of the stationary member by a quantity sufficient to allow the stationary member to have a rigidity required as the wheel support bearing assembly.

In the event that a load acts on the rotatable member as the automotive vehicle starts traveling, the stationary member undergoes deformation through the rolling elements and such deformation brings about a strain in the sensor unit. The strain sensor provided in the sensor unit detects the strain occurring in the sensor unit. If the relation between the strain and the load is determined beforehand by means of a series of experiments and/or simulations, the load imposed on the vehicle wheel can be detected from an output of the strain sensor. Also, the load so detected can be utilized to control an automotive vehicle.

Since the wheel support bearing assembly of the present invention is of a design, in which the sensor unit including the sensor mounting member and the strain sensor fitted to the sensor mounting member is mounted on the stationary member, the sensor for detecting the load can be snugly and neatly installed in the automotive vehicle. Since the sensor mounting member is a handy component part that is fitted to the stationary member, by fitting the strain sensor to the sensor mounting member, it can be excellent in mass production and the cost can be reduced.

Also, since the sensor mounting member has the plural contact fixing portions fixed to the at least two locations spaced from each other in the direction circumferentially of the stationary member and is provided with the at least one cutout disposed in the stationary member at location confronting a portion intermediate between the plural neighboring contact fixing portions of the sensor mounting member so as to extend in a direction axially thereof, the rigidity of circumferentially opposite portions of the stationary member on respective sides of the cutout can be lowered and as a result, the strains of those opposite portions are larger than that of the remaining portion thereof and, accordingly, the large strain can be transmitted to the sensor mounting member. Also, since the sensor mounting member is a thin walled member as compared with the stationary member, the strain tends to be concentrated on the sensor mounting member and as a result, the larger strain can be obtained than that in the stationary member. In view of these, the strain of the stationary member can be detected with high sensitivity, when the strain is measured by the at least one strain sensor disposed at location, in the sensor mounting member, confronting the portion intermediate between the neighboring contact fixing portions.

It is preferred that at least one of the contact fixing portions is fitted to a circumferential location which deforms more considerably than any other location in a circumferential direction of the stationary member by an effect of an external force acting on the stationary member or a working force between a vehicle tire and a road surface.

The extent to which the stationary member is deformed in the radial direction by the effect of the external force or the working force referred to above varies depending on a location on the circumferential direction thereof. According to a result of analysis, deformation of the stationary member in the radial direction due to the axial load acting at a contact point between the vehicle tire and the road surface is maximum at the zenith position and a position just below the zenith position. If the first contact fixing portion is arranged at the location at which the stationary member is most deformed as compared with that at any other location of the stationary member, the sensor mounting member undergoes a considerable deformation about the fulcrum, defined by the second contact fixing portion that is less susceptible to deformation, as the first contact fixing portion deforms due to a considerable deformation of the stationary member. For this reason, a portion of the sensor mounting member where the strain sensor is fitted results in a more considerable strain and, therefore, the strain in the stationary member can be detected by the strain sensor with further high sensitivity.

It is preferred that the sensor unit is fitted to an outboard portion of the stationary member, for example, to a portion thereof on the outboard side of the outboard rolling surface in the stationary member.

According to the result of analysis and experiments, both of the deformations occurring in the radial and peripheral directions have exhibited the directionality of positive or negative due to the positive or negative of the load such as the external force referred to above or the working force referred to above at only an outboard portion of the stationary member. Accordingly, in order to detect the positive or negative direction of the load, it is necessary to position the sensor unit at the position on the outboard side of the stationary member.

It is preferred that the sensor unit referred to above is fitted to the outer peripheral surface of the stationary member.

Although the sensor unit may be fitted to either the peripheral surface or the end face of the stationary member, fitting of the sensor unit to the peripheral surface allow the deformation of the stationary member to be readily transmitted to the sensor mounting member and, accordingly the strain occurring in the stationary member can be detected with high sensitivity.

A plurality of sensor units can be employed.

When the plural sensor units are provided at a plurality of locations of the stationary member, deformation occurring at various parts of the stationary member can be detected and, therefore, detailed information on the strain in the stationary member can be obtained.

It is preferred to employ an estimation section, operable in response to an output from the strain sensor for calculating an external, force acting on the wheel support bearing assembly or a working force between a vehicle tire and a road surface or an amount of preload in the wheel support bearing assembly.

When the external force acting on the wheel support bearing assembly or the working force between the vehicle tire and the road surface or the amount of preload in the wheel support bearing assembly, which is obtained from the estimation section, is utilized in a vehicle control of the automotive vehicle, a meticulous vehicle control can be carried out.

A temperature sensor may be provided in the sensor mounting member.

Since the temperature of the wheel support bearing assembly changes during the use thereof, such change in temperature will affect the strain of the sensor mounting member or the operation of the strain sensor. Also, influences similar to that will be brought about even with a change in environmental temperature. By allowing the temperature characteristic of the strain sensor to be corrected in reliance on an output of the temperature sensor, the load can be detected with high accuracy.

At least one of an acceleration sensor and a vibration sensor may be provided in the sensor mounting member.

When in addition to the strain sensor, the various sensors such as the acceleration sensor and the vibration sensor are fitted to the sensor mounting member, the load and the operation condition of the wheel support bearing assembly can be measured at one location and the wiring can therefore be simplified.

The strain sensor may include an insulating layer formed on a surface of the sensor mounting member by means of printing and baking, and electrodes and a strain measuring resistance element formed on the insulating layer by means of printing and baking.

When the strain sensor is formed in the manner as described above, no reduction in bonding strength with passage of time do not occur such as observed in the case where the strain sensor is fixed by bonding to the sensor mounting member, and, accordingly, the reliability of the sensor unit can be increased. Also, since the processing is easy, the cost can be reduced.

A sensor signal processing circuit unit including a sensor signal processing circuit for processing an output signal of the strain sensor may be fitted to the stationary member in proximity to the sensor unit.

The use of the sensor signal processing circuit unit in the vicinity of the sensor unit is effective to simplify the labor required to provide a wiring from the sensor unit to the sensor signal processing circuit unit. Also, as compared with the case in which the sensor signal processing circuit unit is arranged at a location other than the wheel support bearing assembly, the sensor signal processing circuit unit can be compactly installed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENT

Figure 1:
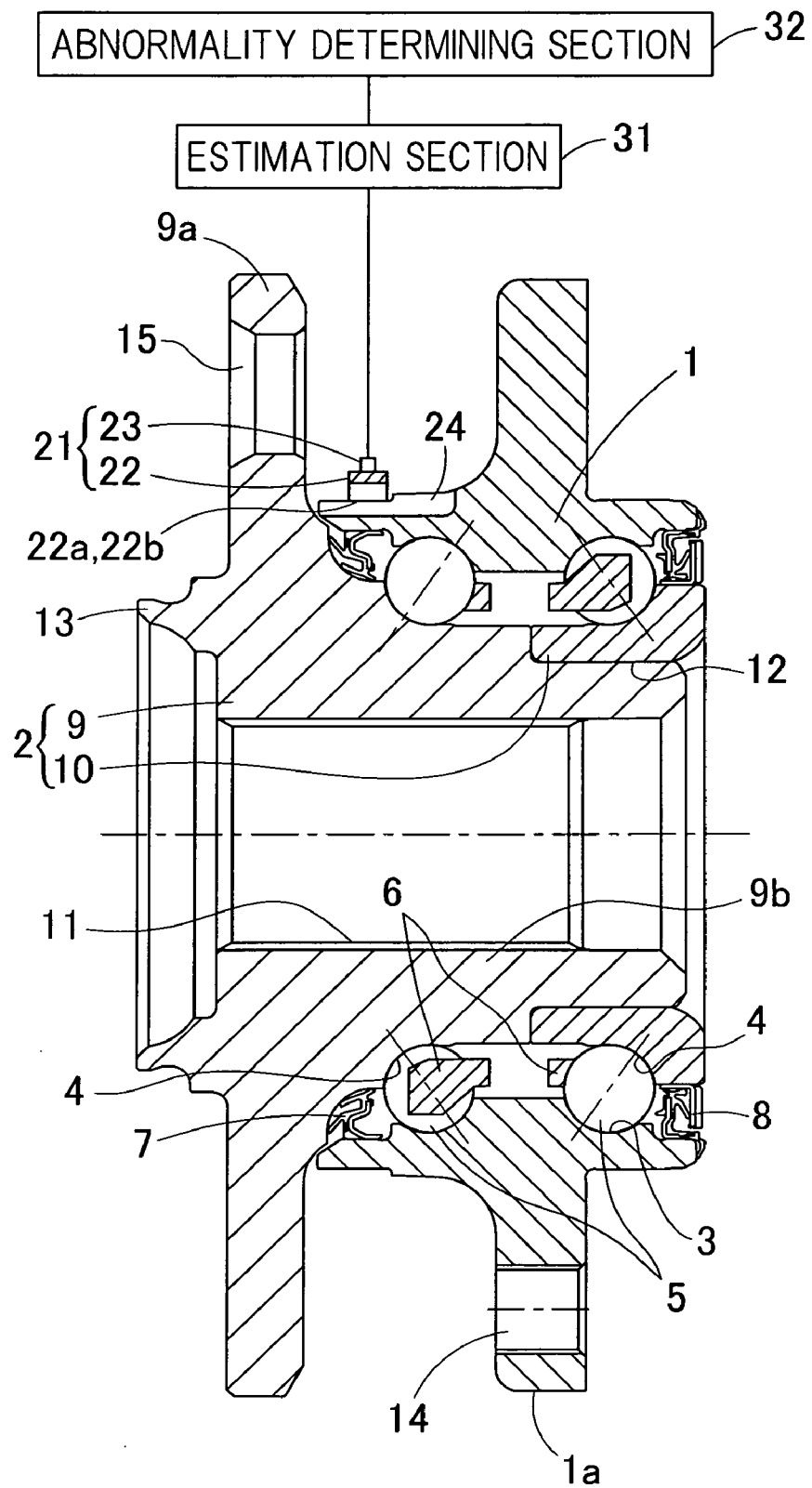
FIG. 1 is a diagram showing a sectional view of a sensor incorporated wheel support bearing assembly according to a first preferred embodiment of the present invention together with a block diagram of a conceptual construction of a detecting system therefor.

A first preferred embodiment of the present invention will be described in detail with particular reference to FIGS. 1 to 3. This embodiment is directed to an inner race rotating model of a three generation type that is applied to a wheel support bearing assembly for the support of a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively when assembled in the vehicle body.

The sensor incorporated wheel support bearing assembly according to this embodiment includes an outer member 1 having its inner periphery formed with a plurality of rolling surfaces 3, an inner member 2 formed with rolling surfaces 4 confronting or in face-to-face relation with the respective rolling surfaces 3, and double row rolling elements 5 interposed between the rolling surfaces 3 of the outer member 1 and the rolling surfaces 4 of the inner member 2. This wheel support bearing assembly is rendered to be a double row angular contact ball bearing type, in which the rolling elements 5 are employed in the form of balls that are rollingly retained by retainers 6 employed for each row. The rolling surfaces 3 and 4 have arcuately sectioned shapes and the rolling surfaces 3 and 4 are so formed as to have a contact angle oriented outwardly. Opposite annular open ends of a bearing space delimited between the outer member 1 and the inner member 2 are sealed by respective sealing devices 7 and 8.

The outer member 1 is the one that serves as a stationary member and is of one-piece construction having its outer periphery formed with a flange 1a for securement to an automobile suspension system (not shown) mounted on the automotive vehicle. The flange 1a has a plurality of vehicle mounting holes 14 defined at a corresponding number of circumferential locations thereof.

The inner member 2 is the one that serves as a rotatable member and includes a hub unit 9 having a hub flange 9a for the support of a vehicle wheel and an inner ring 10 mounted on an inboard end of a hub axle 9b of the hub unit 9. The double row rolling surfaces 4 referred to previously are formed respectively in the hub unit 9 and the inner ring 10. The inboard end of the hub unit 9 has its outer periphery radially inwardly stepped to define an inner ring mounting area 12 of a reduced diameter, with the inner ring 10 fixedly mounted thereon. The hub unit 9 has a center bore 11 defined therein so as to extend axially completely through the length of the hub unit 9. The hub flange 9a has a plurality of press-fitting holes 15 defined in respective circumferential locations thereof for receiving corresponding hub bolts (not shown) press-fitted therein. The hub flange 9a of the hub unit 9 has a root portion thereof, adjacent the hub axle 9b, formed with a cylindrical pilot portion 13 so as to protrude in an outboard direction, which pilot portion 13 serves to guide the vehicle wheel and a brake component not shown.

A sensor unit 21 is mounted on an outboard end of the outer member 1 and positioned generally intermediate between the flange 1a of the outer member 1 and the hub flange 9a. Specifically, the sensor unit 21 is axially so positioned as to be on an outboard side of the outboard rolling surface 3 and, more particularly, at an axial position generally intermediate between the outboard rolling surface 3 and the outboard end of the outer member 1. This sensor unit 21 includes a sensor mounting member 22 fitted to the outer member 1 and a strain sensor 23, fitted to the sensor mounting member 22, for measuring a strain occurring in the sensor mounting member 22.

Figure 2:
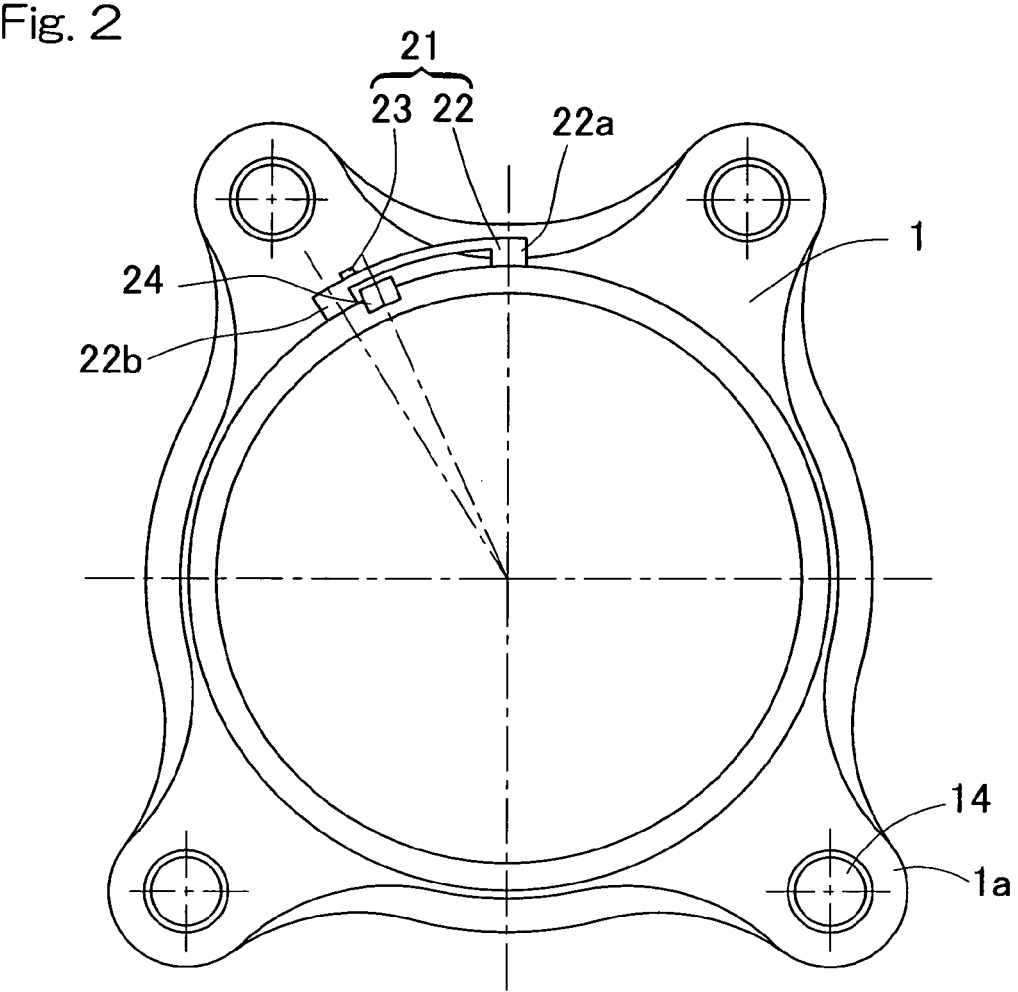
FIG. 2 is a front elevational view showing an outer member of the sensor incorporated wheel support bearing assembly and a sensor unit.
Figure 3A:
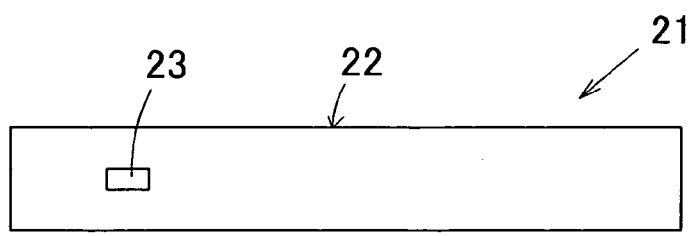
FIG. 3A is a top plan view of the sensor unit.
Figure 3B:
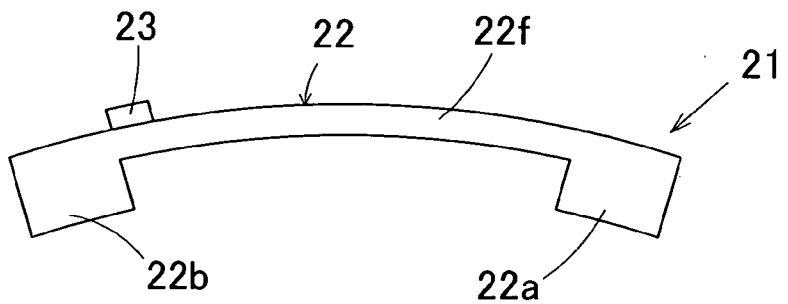
FIG. 3B is a front elevational view thereof.

As shown in FIGS. 2 and 3, the sensor mounting member 22 is of a generally elongated arcuate configuration so curved as to follow the curvature of an outer peripheral surface of the outer member 1, having its opposite ends formed with contact fixing portions 22a and 22b so as to protrude radially inwardly of the outer member 1 and as to be connected together through a non-contact connecting bridge portion 22f. This connecting bridge portion 22f is depressed inwardly thereof or radially outwardly of the outer member 1 so that the connecting bridge portion 22f, when the sensor mounting member 22 is mounted on the outer member 1, will not contact any outer peripheral surface of the outer member 1. The connecting bridge portion 22f has an outer curved surface flush with respective outer peripheral surfaces of the fixing contact portions 22a and 22b and, accordingly, the connecting bridge portion 22f has a wall thickness smaller than the contact fixing portions 22a and 22b, that is, has a small thickness in a radial direction. The strain sensor 23 is fitted to an outer curved surface of the connecting bridge portion 22f and specifically, positioned at a location generally intermediate between the contact fixing portions 22a and 22b and adjacent one 22b of the contact fixing portions. In the case of the illustrated embodiment, the strain sensor 23 is fitted to the sensor carried member 22 by the use of any suitable bonding agent. The sensor mounting member 22 has a sectional shape similar to, for example, a rectangular shape, but may have any suitable sectional shape.

The sensor unit 21 referred to above is fixed to the outer periphery of the outer member 1 through the contact fixing portions 22a and 22b of the sensor mounting member 22 with its longitudinal direction oriented in a direction conforming to the circumferential direction of the outer member 1. Fixture of the contact fixing portions 22a and 22b to the outer member 1 is carried out by means of, for example, bonding with the use of a bonding agent. With the sensor unit 21 fitted to the outer member 1 in the manner described above, a portion of the sensor mounting member 22 other than the contact fixing portions 22a and 22b is spaced a distance from the outer peripheral surface of the outer member 1 to define a gap.

Of the contact fixing portions 22a and 22b, the first contact fixing portion 22a is fixed to the outer member 1 at a circumferential location at which the outer member 1 is most deformed in a radial direction by the effect of a load acting on the outer member 1, and the second contact fixing portion 22b is fixed to the outer member 1 at a circumferential direction at which the deformation in the radial direction is less considerable than that at the circumferential location at which the outer member 1 is most deformed as described above. In the case of the illustrated embodiment, the first contact fixing portion 22a is positioned at a zenith position (which means the highest point directly above the road surface) of the circumference of the outer member, and the second contact fixing portion 22b is positioned at a position spaced several dozens, for example, 30 to 45 degrees downwardly from the zenith position. Also, in this illustrated embodiment, one of the contact fixing portions remotest from the strain sensor 23 is referred to as the first contact fixing portion 22a whereas the other of the contact fixing portion closest to the strain sensor 23 is referred to as the second contact fixing portion 22b.

In correspondence with the sensor unit 21, a portion of the outer peripheral surface of the outer member 1 has an axially extending cutout 24 defined therein so as to extend axially of the outer member 1. The cutout 24 employed in the practice of the embodiment now under discussion is in the form of a groove extending from an axial position of the outboard rolling surface 3 towards the outboard end of the outer member 1. The circumferential position of this cutout 24 is generally intermediate between the mutually neighboring contact fixing portions 22a and 22b of the sensor mounting member 22 and is, in the illustrated embodiment, at a position in the same circumferential phase as the strain sensor 23. This cutout 24 is so provided as to partially lower the rigidity of the outer member 1 down to a value sufficient to preserve the rigidity required in the wheel support bearing assembly.

The sensor mounting member 22 referred to above is made of such a material and in such a shape that no plastic deformation will not occur when the sensor mounting member 22 is fixed to the outer member 1. Also, the sensor mounting member 22 must be of such a shape that the sensor mounting member 22 will not plastically deform even when a maximum expected load is applied to the wheel support bearing assembly. The maximum expected force referred to above is a maximum force supposed during the travel of the automotive vehicle that does not lead to a trouble in the automotive vehicle. Once the sensor mounting member 22 deforms plastically, deformation of the outer member 1 will not be accurately transmitted to the sensor mounting member 22, wherefore the measurement of the strain will be affected adversely. When the sensor unit 22 is so constructed as hereinabove described, this can be avoided.

The sensor mounting member 22 of the sensor unit 21 can be formed by the use of, for example, a press work. Formation of the sensor mounting member 22 with the use of a press work is effective to reduce the cost.

Also, the sensor mounting member 22 may be a product of a sintered metal that is formed by molding a powdery metal with the use of a metal injection molding technique. The injection molding of a powdery metal is one of molding techniques used in molding a metal or an intermetallic compound, and includes a step of kneading the powdery metal with a binder, a step of molding the kneaded mixture by means of an injection molding, a step of defatting the molded product and a step of sintering the molded product. With this injection molding of the powdery metal, some advantages can be appreciated that a sintered body of a high sintered density can be obtained as compared with the standard powdery metallurgy and a sintered metal product can also be prepared with a high dimensional accuracy and can have a high mechanical strength.

For the strain sensor 23, any of various sensors can be employed. For example, where the strain sensor 23 is in the form of a metallic foil strain gauge, considering the durability of the metal foil strain gauge, the amount of strain occurring at the strain sensor 23 mounting portion of the sensor mounting member 22 is preferred to be smaller than 1,500 microstrain even when the maximum expected load is applied on the wheel support bearing assembly. By a reason similar to that described above, where the strain sensor 23 is in the form of a semiconductor strain gauge, the amount of the strain is preferred to be smaller than 1,000 microstrain. On the other hand, where the strain sensor 23 is in the form of a thick film type sensor, the amount of the strain is preferred to be smaller than 1,500 microstrain.

As shown in FIG. 1, as a means of processing an output of the strain sensor 23, an estimation section 31 and an abnormality determining section 32 are employed. These sections 31 and 32 may be those provided in an electronic circuit device (not shown) such as, for example, a circuit substrate fitted to the outer member 1 or the like of the wheel support bearing assembly or those provided in an electronic control unit (ECU) of an automotive vehicle.

The operation of the wheel support bearing assembly of the structure hereinabove described will now be described. When a load is applied to the hub unit 9, the outer member 1 is deformed through the rolling elements 5 and such deformation is transmitted to the sensor mounting member 22 that is fitted to the outer member 1, resulting in deformation of the sensor mounting member 22. The strain of this sensor mounting member 22 is measured by the strain sensor 23. At this time, the sensor mounting member 22 deforms in accordance with deformation of that portion of the outer member 1, where the sensor mounting member 22 is fixed, in a radial direction. Since the axially extending cutout 24 is provided at a location on the outer peripheral surface of the outer member 1, which is generally intermediate between the contact fixing portions 22a and 22b, the rigidity of portions of the outer member 1 adjacent the opposite ends of the cutout 24 is lowered and the strain at those portions of the outer member 1 is therefore more considerable than that at any other portion, with such considerable strain being then transmitted to the sensor mounting member 22. Also, since the sensor mounting member 22 is thin walled as compared with the outer member 1, the strain is concentrated on the sensor mounting member 22 and a larger strain than that in the outer member 1 can be obtained in the sensor mounting member 22. In view of these, the strain of the outer member 1 can be detected with high sensitivity, when the strain occurring in the sensor mounting member 22 is measured with the strain sensor 23 arranged in the non-contact bridge portion 22f of the sensor mounting member 22.

Of the two contact fixing portions 22a and 22b of the sensor mounting member 22, the first contact fixing portion 22a is preferably fitted to a portion of the outer member 1 at a circumferential location where a more considerable deformation in the radial direction occurs than that at any other portion of the outer member 1 by the effect of an external force acting on the outer member 1 or a working force acting between a wheel tire and the road surface. The extent to which the outer member 1 is deformed in the radial direction by the effect of the external force or the working force referred to above varies depending on a location on the circumferential direction thereof. According to a result of the FEM (Finite Element Method) analysis, deformation of the outer member 1 in the radial direction relative to the axial load acting at a contact point between the vehicle tire and the road surface is maximum at positions remotest and closest to the road surfaces, respectively, that is, at the zenith position and a position just counter to the zenith position. In the illustrated embodiment, since the first contact fixing portion 22a is arranged at the zenith position at which the maximum deformation in the radial direction of the outer member 1 occurs, the strain of the outer member 1 can be detected with high sensitivity and, hence, with high accuracy.

More specifically, when the first contact fixing portion 22a is fitted to that portion of the outer member 1, which is deformed more considerably than at any other portion of the outer member 1, the sensor mounting member 22 is such that the first contact fixing portion 22a undergoes a considerable deformation about a fulcrum, defined by the second contact fixing portion 22b at which deformation is small, in dependence on the considerable deformation of the outer member 1. For this reason, the position, at which the strain sensor 23 is arranged, of the sensor mounting member 22 provides a further considerable strain and, accordingly, the strain occurring in the outer member 1 can be detected by the strain sensor 23 with high sensitivity.

In the embodiment now under discussion, the position of the cutout 24 in the outer member 1 is remote from the first contact fixing portion 22a, which is one of the two contact fixing portions of the sensor mounting member 22, and is kept away from the zenith position, at which the deformation of the outer member in the radial direction is maximum. This cutout 24 is employed satisfying the requirement of rigidity that is required in the wheel support bearing assembly, but it is because considering the strength of the outer member 1, it is preferred that the cutout 24 be provided at a location away from that portion of the outer member 1, where the deformation is considerable, that is, a portion on which a large load acts.

The axial position at which the sensor unit 21 is fitted to the outer member 1 is preferably on the outboard side of the outboard rolling surface 3 of the outer member 1 such as in the embodiment described above. This is because when such position lies on the outboard side of the outboard rolling surface 3, the directionality of positive or negative occurs in the strain according to the direction of the load and the positive or negative direction of the load can be detected.

According to results of the FEM analysis and experiments, as far as the strain of the outer member 1 in both of radial and circumferential directions is concerned, only a portion on the outboard side out of the previously described three divisions in the outer member 1 has exhibited the directionality of positive or negative due to the positive or negative direction of the load such as, for example, the external force or the working force both referred to hereinbefore. Accordingly, in order to detect the positive or negative direction of the load, the sensor unit 21 is required to be arranged at a position of the outer member 1 on the outboard side.

Also, the sensor unit 21 is preferably provided on the peripheral surface of the outer member 1 such as in the illustrated embodiment. Although the sensor unit 21 may be fitted to either an end face or a peripheral surface of the stationary member, fitting to the peripheral surface allows the deformation of the stationary member to be easily transmitted to the sensor mounting member and, accordingly, the strain of the stationary member can be detected with high sensitivity.

Since the manner of change of the strain varies depending on the direction and the magnitude of the load, by determining the relation between the strain and the load beforehand by means of a series of experiments and/or simulations, the external force acting on the wheel support bearing assembly or the working force between the vehicle tire and the road surface can be calculated. The estimation section 31 referred to previously is operable to calculate the external force acting on the wheel support bearing assembly or the working force between the vehicle tire and the road surface in reference to an output from the strain sensor 23 by the utilization of the relation between the strain and the load which has been determined by means of the experiments and/or simulations. The abnormality determining section 32 referred to previously is operable to output an abnormality signal to the outside when the section 32 determines that the external force acting on the wheel support bearing assembly or the working force between the vehicle tire and the road surface, which has been calculated by the estimation section 31, exceeds a tolerance. This abnormality signal can be used in a vehicle control of the automotive vehicle. Also, when the external force acting on the wheel support bearing assembly or the working force between the vehicle tire and the road surface is detected in real time, a meticulous vehicle control can be carried out.

Also, although the wheel support bearing assembly has a preload applied by the inner member 2, the sensor mounting member 22 is deformed by such preload as well and, accordingly, if the relation between the strain and the preload is determined beforehand by means of a series of experiments and/or simulations, the amount of preload in the wheel support bearing assembly can also be calculated. The estimation section 31 calculates the amount of preload in the wheel support bearing assembly from the relation between the strain and the preload which has been determined by means of the experiments and/or simulations. Accordingly, the status of preload in the wheel support bearing assembly can be ascertained. Also, the preload can easily be adjusted at the time of assemblage of the wheel support bearing assembly.

Figure 4:
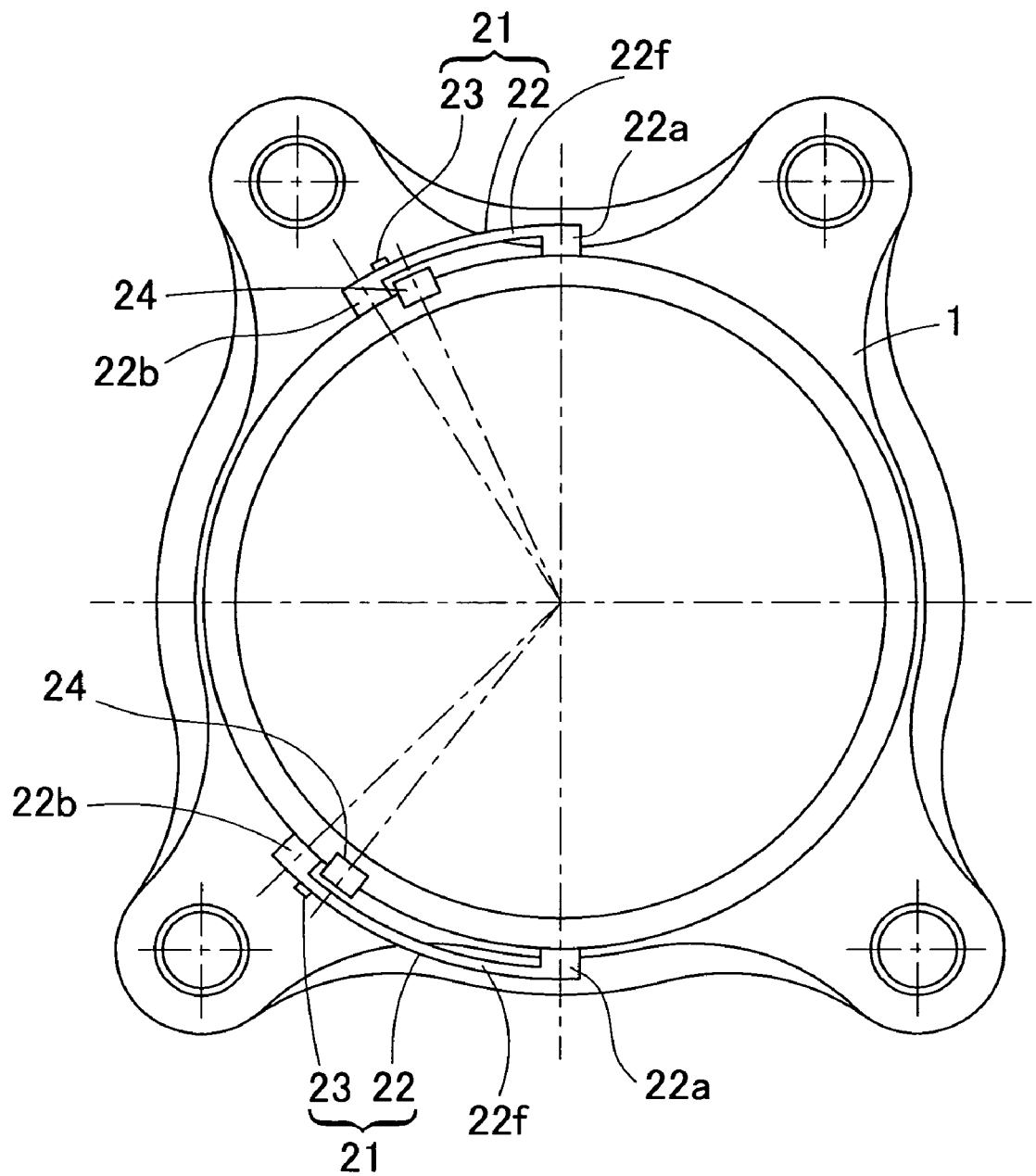
FIG. 4 is a front elevational view showing a different example of the outer member of the sensor incorporated wheel support bearing assembly and the sensor unit.
Figure 5:
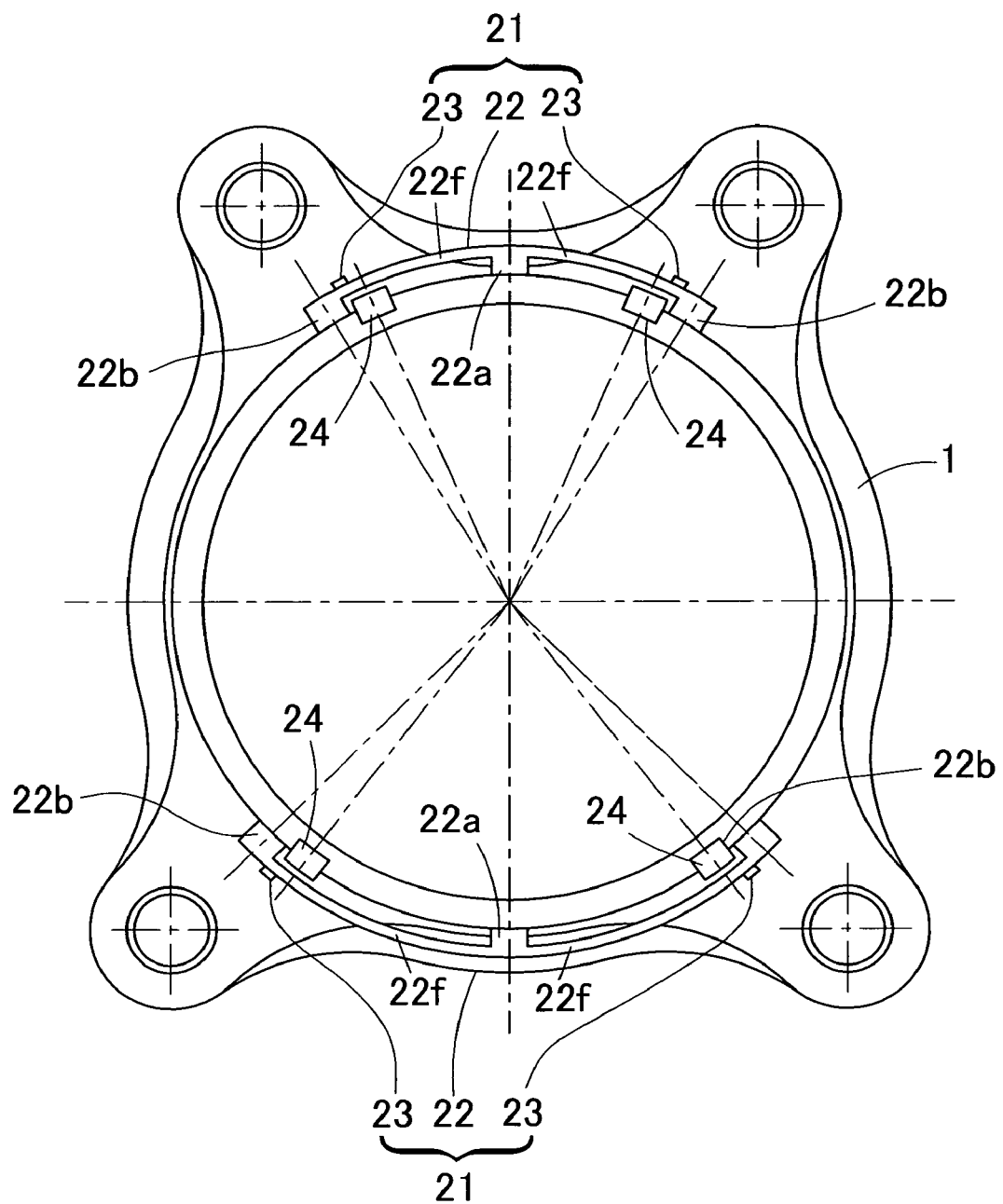
FIG. 5 is a front elevational view showing a further different example of the outer member of the sensor incorporated wheel support bearing assembly and the sensor unit.

Although in the foregoing embodiment, the sensor unit 21 has been shown and described as arranged at one location, the sensor unit 21 may be arranged at, for example, two or more locations as shown in FIG. 4 or FIG. 5. Also, as shown in FIG. 5, the sensor mounting member 22 of the single sensor unit 21 may have three or more contact fixing portions such as identified by 22a, 22b and 22b, the strain sensor 23 is provided at two or more locations on the non-contact bridge portion 22f and, in correspondence therewith, the cutout 24 may be provided at two or more locations of the outer member 1. Where the sensor unit 21 is provided at a plurality of locations and the strain sensor 23 is provided at a plurality of locations for one sensor unit 21, it is possible to achieve the detection of the load with further high accuracy.

Also, where the sensor unit 21 is provided in a plural number, each of those sensor units may be arranged in different ones of quadrants (first to fourth quadrants) of the entire circumference of the outer member 1. By so doing, the load in different directions can be detected.

Figure 6:
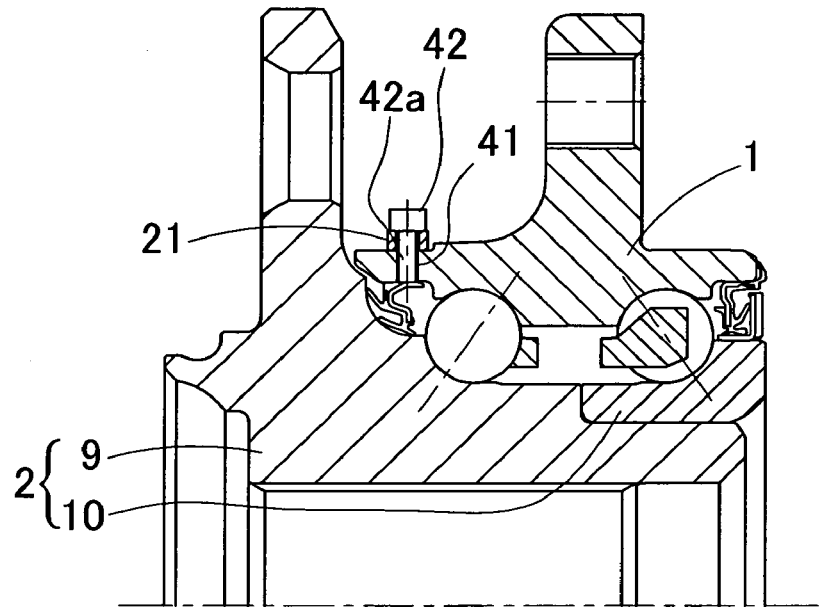
FIG. 6 is a sectional view showing an upper half of the sensor incorporated wheel support bearing assembly according to a second preferred embodiment of the present invention.
Figure 7A:
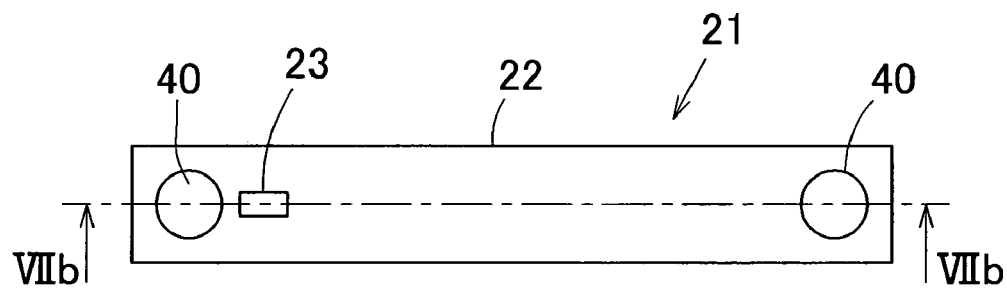
FIG. 7A is a top plan view of the sensor unit used in the sensor incorporated wheel support bearing assembly.
Figure 7B:
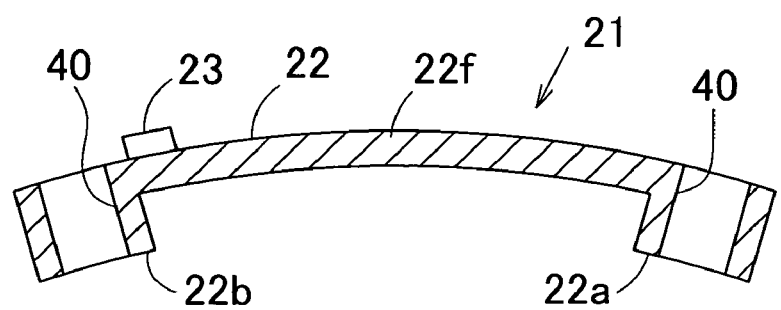
FIG. 7B is a cross-sectional view taken along the line VIIb-VIIb in FIG. 7A.

FIGS. 6 and 7 illustrate a second preferred embodiment of the present invention. The wheel support bearing assembly according to this second embodiment is of a type in which fixing of the sensor mounting member 22 to the outer member 1 is carried out by the use of bolts. As best shown in FIG. 7, the entire shape of this sensor mounting member 22 is the same as that of the sensor mounting member 22 shown in FIG. 3 and a bolt insertion hole 40 is formed in each of the first and second contact fixing portions 22a and 22b. The outer member 1 is formed with a bolt threading hole 41 having an inner peripheral surface threaded and defined therein at a location corresponding to each of the bolt insertion holes 40. As shown in FIG. 6, the sensor unit 21 is fixed on the outer member 1 with the bolts 42 passed from an outer peripheral side through the respective bolt insertion holes 40 and with male threaded portions 42a of those bolts 42 subsequently threaded in the associated bolt threaded holes 41.

For fixing the sensor mounting member 22 to the outer member 1 together, either a bonding agent or bolts may be employed. Also, the both may concurrently be employed. In addition, without the bonding agent nor the bolts being employed, the sensor mounting member 22 and the outer member 1 may be connected together by means of a welding.

Whichever any of those fixing methods is employed, the sensor mounting member 22 and the outer member 1 can be firmly fixed together. For this reason, deformation of the outer member 1 can be accurately transmitted to the sensor mounting member 22 without the sensor mounting member 22 being displaced in position relative to the outer member 1.

Figure 8A:
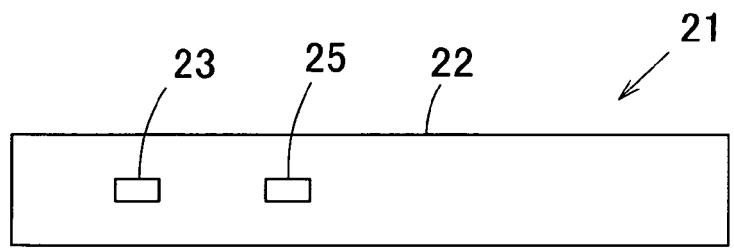
FIG. 8A is a top plan view showing a different sensor unit.
Figure 8B:
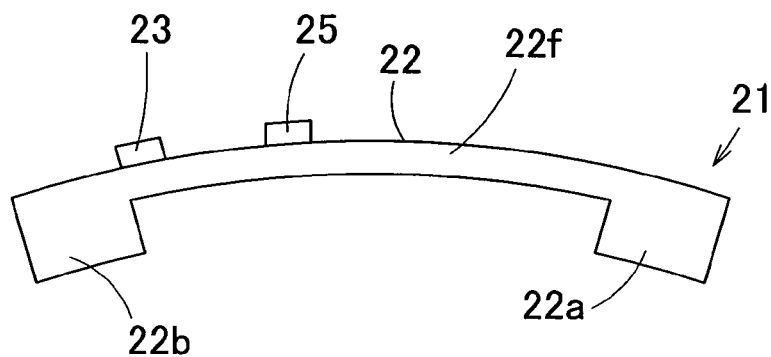
FIG. 8B is a front elevational view thereof.

FIG. 8 illustrates a different embodiment of the sensor unit. The sensor unit 21 shown therein is provided with a temperature sensor 25 separate from the strain sensor 23. It is to be noted that the sensor mounting member 22 has a shape which is the same as that shown in FIG. 3, and the strain sensor 23 and the temperature sensor 25 are fitted to the non-contact bridge portion 22f of the sensor mounting member 22. For the temperature sensor 25, a platinum resistance temperature detector, a thermocouple or a thermister, for example, can be employed. Also, a sensor capable of detecting a temperature, other than those, can be employed.

Even in the wheel support bearing assembly in which this sensor unit 21 is provided, the strain sensor 23 detects the strain of the sensor mounting member 22, with which strain the load applied to the vehicle wheel can be measured. In the meantime, the temperature of the wheel support bearing changes during the use thereof and such change in temperature affects the strain of the sensor mounting member 22 or the operation of the strain sensor 23. In view of this, the influence of the strain sensor 23, brought about by the temperature, can be eliminated by detecting the temperature of the sensor mounting member 22 with the temperature sensor 25 arranged on the sensor mounting member 22 and then correcting an output of the strain sensor 23 in reference to the temperature so detected. In this way, a highly precise load detection can be achieved.

Figure 9A:
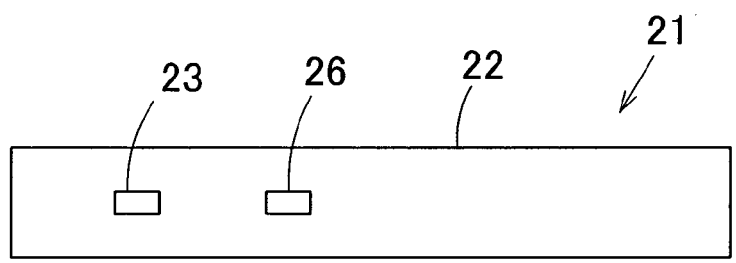
FIG. 9A is a top plan view showing a further different sensor unit.
Figure 9B:
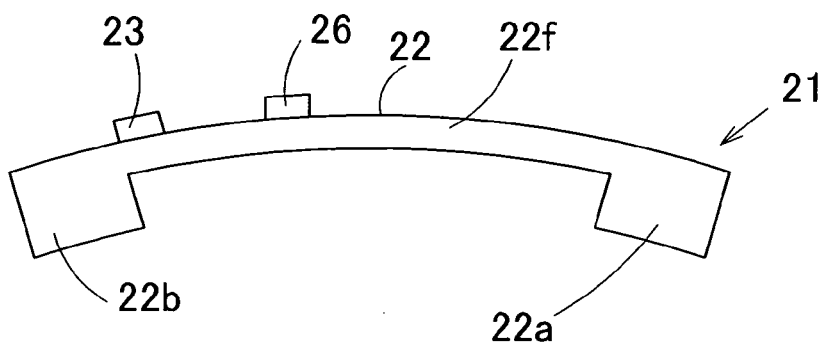
FIG. 9B is a front elevational view thereof.

FIG. 9 illustrates a further embodiment of the sensor unit. The sensor unit 21 shown therein is provided with various sensors 26 separate from the strain sensor 23. The various sensors 26 is at least one of an acceleration sensor and a vibration sensor. It is to be noted that the sensor mounting member 22 has a shape which is the same as that shown in FIG. 3, and the strain sensor 23 and the various sensors 26 are fitted to the non-contact bridge portion 22f of the sensor mounting member 22.

When the strain sensor 23 and the various sensors 26 are fitted to the sensor mounting member 22 in this way, the load and the condition of the wheel support bearing assembly can be measured at one location and, therefore, the wiring or the like can be simplified.

Figure 10:
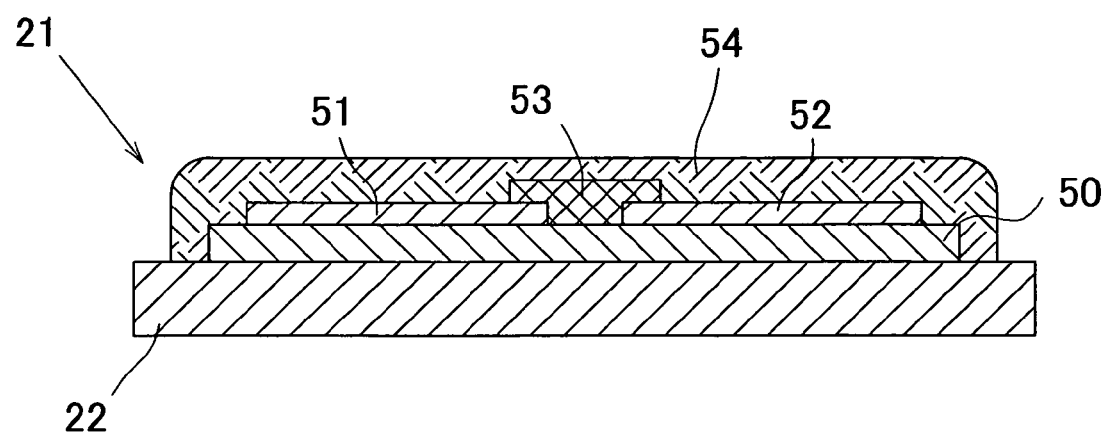
FIG. 10 is a diagram showing a sectional structure of a further different sensor unit.

FIG. 10 illustrates the structure of a sensor unit in which the strain sensor is formed in a manner different from that in any one of the foregoing embodiments. The sensor unit 21 shown therein is of a structure including an insulating layer 50 formed on the sensor mounting member 22, a pair of electrodes 51 and 52 formed on a surface of the insulating layer 21, a strain measuring resistance element 53, which eventually forms the strain sensor, formed on the insulating layer 50 at a location intermediate between the electrodes 51 and 52, and a protective film 54 formed so as to cover the electrodes 51 and 52 and the strain measuring resistance element 53.

A method of making this sensor unit 21 will now be described. At the outset, an insulating material such as, for example, glass is printed on a surface of the sensor mounting member 22, made of a metallic material such as, for example, a stainless steel, and is then baked to form the insulating layer 50. Subsequently, an electroconductive material is printed on a surface of the insulating layer 50 and is then baked to form the electrodes 51 and 52. Thereafter, a material which eventually forms a resistance element is printed between the electrodes 51 and 52 and is then baked to form the strain measuring resistance element 53. Finally, for protecting the electrodes 51 and 52 and the strain measuring resistance element 53, the protective film 54 is formed.

Although the strain sensor is generally fixed in position by means of bonding to the sensor mounting member 22, this fixing method involves a problem that reduction of the bonding strength with passage of time will adversely affect the detection performed by the strain sensor and will constitute a cause of increase of the cost. In contrast thereto, when the sensor unit 21 is employed, in which the insulating layer 50 is formed on the surface of the sensor mounting member 22 by means of printing and baking and the electrodes 51 and 52 and the strain measuring resistance element 53, which eventually forms the strain sensor, are then formed by printing and baking, it is possible to increase the reliability and to reduce the cost.

Figure 11:
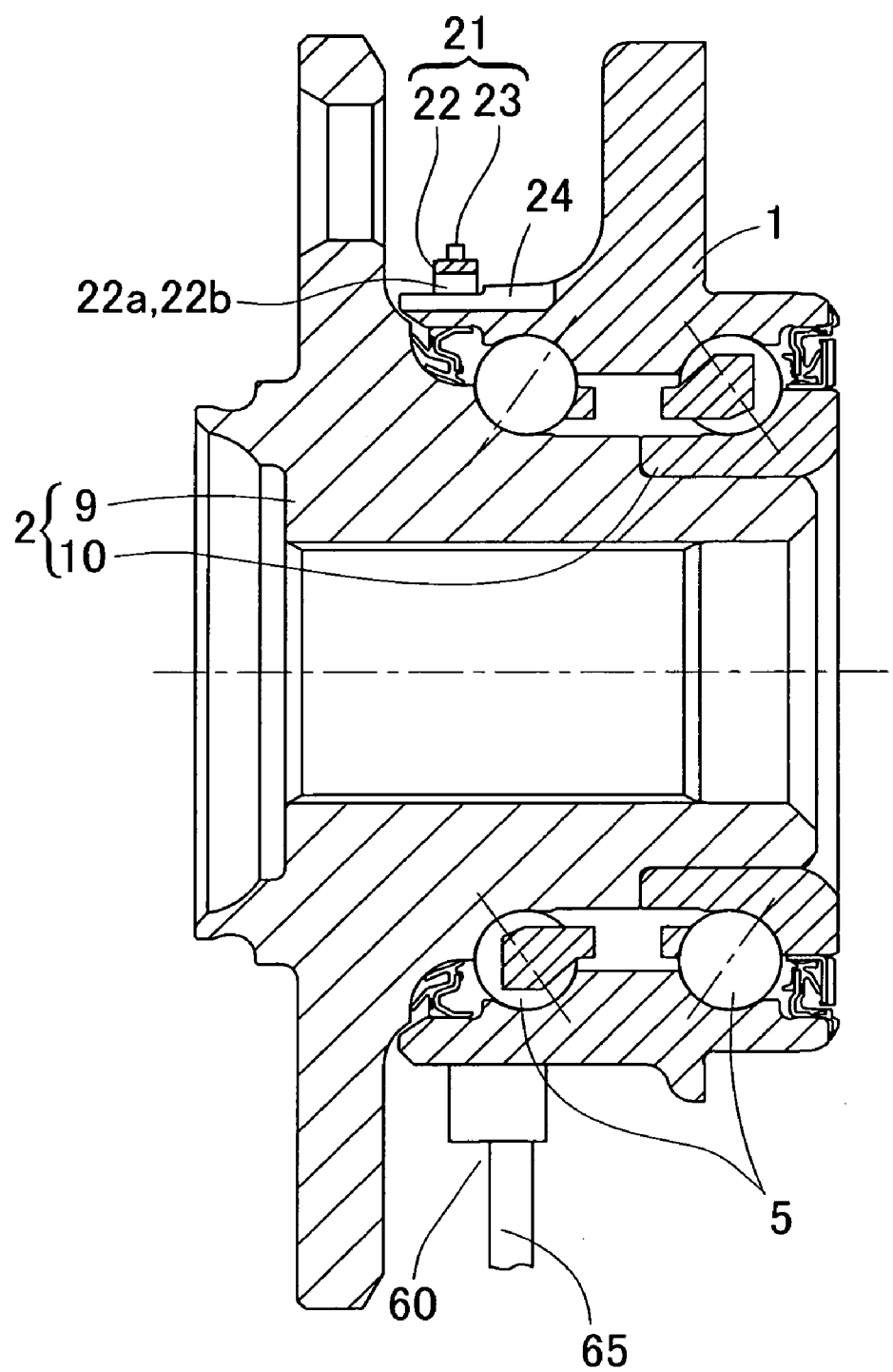
FIG. 11 is a sectional view showing the sensor incorporated wheel support bearing assembly according to a third preferred embodiment of the present invention.
Figure 12:
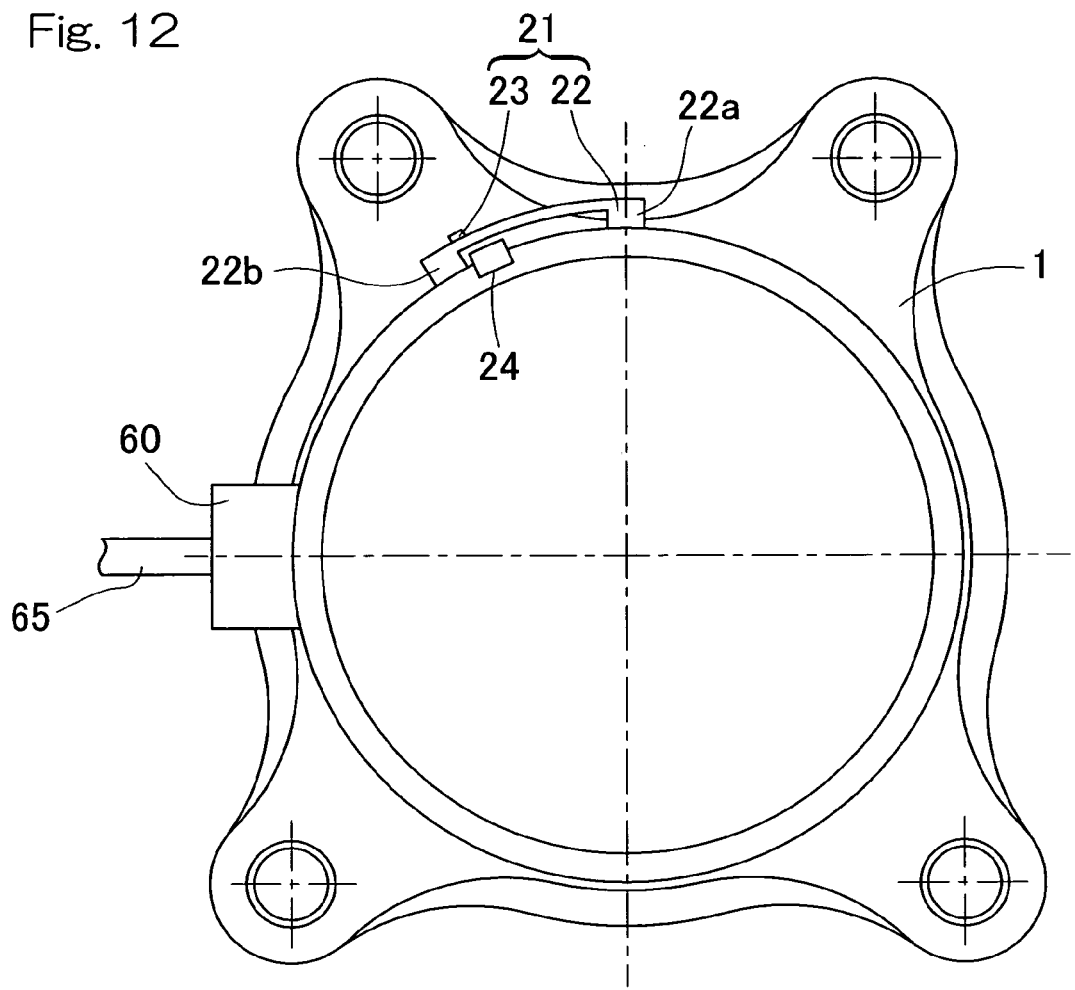
FIG. 12 is a front elevational view showing the outer member of the sensor incorporated wheel support bearing assembly and the sensor unit.
Figure 13:
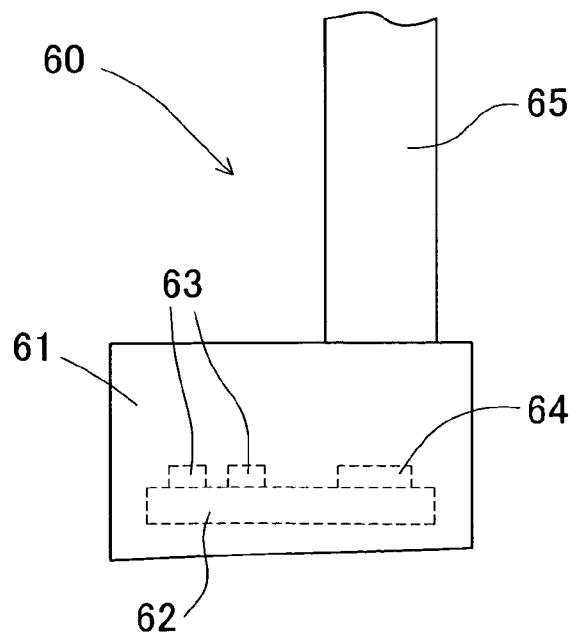
FIG. 13 is a side view showing a sensor signal processing circuit unit.

FIGS. 11 to 13 illustrate a third preferred embodiment of the present invention. The wheel support bearing assembly shown therein has incorporated therein a sensor signal processing circuit unit 60 operable to process respective outputs of the various sensors (including the temperature sensor, the acceleration sensor and the vibration sensor) and the strain sensor provided in the sensor unit 21. This sensor signal processing circuit unit 60 is fitted to the outer peripheral surface of the outer member 1 which serves as the stationary member.

The sensor signal processing circuit unit 60 includes a housing 61 made of a resinous material, a circuit board 62 made of, for example, a glass epoxy and accommodated in the housing 61, an operational amplifier for processing an output signal of the strain sensor 23, a resistor and electric/electronic component parts 63 for the supply of an electric power necessary to drive a microcomputer or the like and the strain sensor 23 all mounted on the circuit board 62. Also, the sensor signal processing circuit unit 60 has a coupler 64 for connecting the wiring of the strain sensor 23 with the circuit substrate 62. In addition, the sensor signal processing circuit unit 60 has a cable 65 for the supply of an electric power from the outside and also for outputting an output signal which has been processed by the sensor signal processing circuit. Where the previously described various sensors (the temperature sensor, the acceleration sensor and the vibration sensor) are provided in the sensor unit 21, the sensor signal processing circuit unit 60 is provided with the circuit substrate 62, the electric/electronic component parts 63, the coupler 64, the cable 65 and so on which are associated with the sensors used.

In general, the sensor signal processing circuit unit, employed in the wheel support bearing assembly, for processing the respective outputs from the various sensors is incorporated in the electric control unit (ECU) of the automotive vehicle, but when the sensor signal processing circuit unit 60 is provided in the vicinity of the sensor unit 21 in the wheel support bearing assembly such as in this embodiment, the labor required to connect between the sensor unit 21 and the sensor signal processing circuit unit 60 can be simplified and, also, the sensor signal processing circuit unit 60 can be installed more compactly than that in which the sensor signal processing circuit 60 is provided at any location other than the wheel support bearing assembly.

It is to be noted that in describing any one of the foregoing embodiments of the present invention the outer member 1 is shown and described as serving the stationary member, the present invention can be equally applicable to the wheel support bearing assembly, in which the inner member serves as the stationary member and, in such case, the sensor unit 21 is provided on an inner periphery of the inner member.

Also, although the present invention has been shown and described as applied to the wheel support bearing assembly of the third generation type, the present invention can be equally applied to the wheel support bearing assembly of a first or second generation type, in which the bearing unit and the hub unit are component parts separate from each other and also to the wheel support bearing assembly of a fourth generation type, in which a part of the inner member is constituted by an outer ring of a constant velocity universal joint. Yet, the sensor incorporated wheel support bearing assembly of the present invention can be applied to that for the support of a vehicle driven wheel and also to the wheel support bearing assembly of any generation type utilizing tapered rollers.

Other preferred modes of the present invention hereinabove described can be summarized as follows:

[First Mode]

The sensor incorporated wheel support bearing assembly according to a first mode of the present invention is such that even when the maximum expected force is applied as an external force acting on the stationary member or a working force acting between the vehicle tire and the road surface, the sensor mounting member of the sensor unit will not deform plastically.

The maximum expected force referred to above is a maximum force expected during the travel that does not lead to a trouble in the automotive vehicle. If the plastic deformation takes place in the sensor unit, the deformation of the stationary member will not be accurately transmitted to the sensor mounting member of the sensor unit, with the measurement of the strain adversely affected consequently. Accordingly, when the sensor mounting member of the sensor unit is of the type that will not deform plastically, the inconveniences can be avoided.

[Second Mode]

The sensor mounting member is a product formed by a press work.

If the sensor mounting member is formed by a press work, the processing is easy and the cost can be reduced.

[Third Mode]

The sensor mounting member is made from a sintered metal formed by the use of a powdery metal injection molding technique.

If the sensor mounting member is formed by the use of a powdery metal injection molding technique, the sensor mounting member having an excellent dimensional accuracy can be obtained.

[Fourth Mode]

Fixing the sensor mounting member to the stationary member is carried out by the use of bolts or a bonding agent or the both, or by means of welding.

If the sensor mounting member and the stationary member are fixed together by a method utilizing either the bolts or the bonding agent, it is possible to firmly fix the sensor mounting member to the stationary member. Because of this, deformation of the stationary member can be accurately transmitted to the sensor mounting member without the sensor mounting member displaced in position relative to the stationary member.

Figure 14:
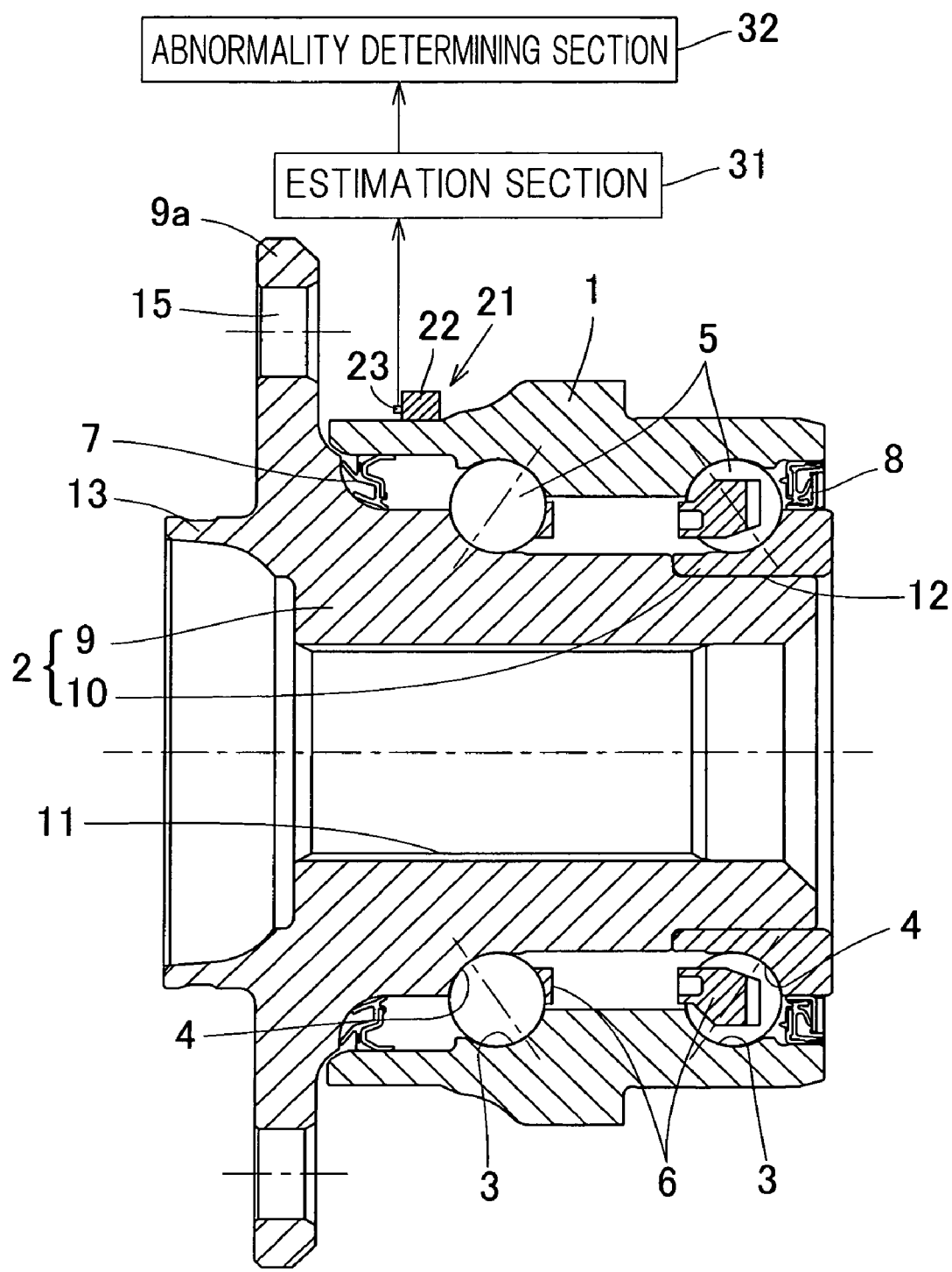
FIG. 14 is a diagram showing a sectional view of the sensor incorporated wheel support bearing assembly according to a first example of application of the present invention together with a block diagram of the conceptual construction of the detecting system therefor.

Examples of application of the present invention, in which no cutout is employed, will now be described. Even those examples of application are applied to the inner ring rotating type of the wheel support bearing assembly of a third generation type as shown in FIG. 14, which is used to support a vehicle drive wheel and the sensor mounting member 22 is fitted to the outer peripheral surface of the outer member 1. Those examples of application are different from the first preferred embodiment of the present invention particularly shown in FIG. 1 in that a plurality of contact fixing portions 22a, 22b, 22c (FIG. 15) are arranged at locations spaced a distance from each other in a direction circumferentially of the stationary member, and at least one contact fixing portion of the plural contact fixing portions 22a, 22b,22c for example, the contact fixing portion at the location, where deformation in the radial direction is considerable, has the strain sensor 23 fitted thereto.

Figure 15:
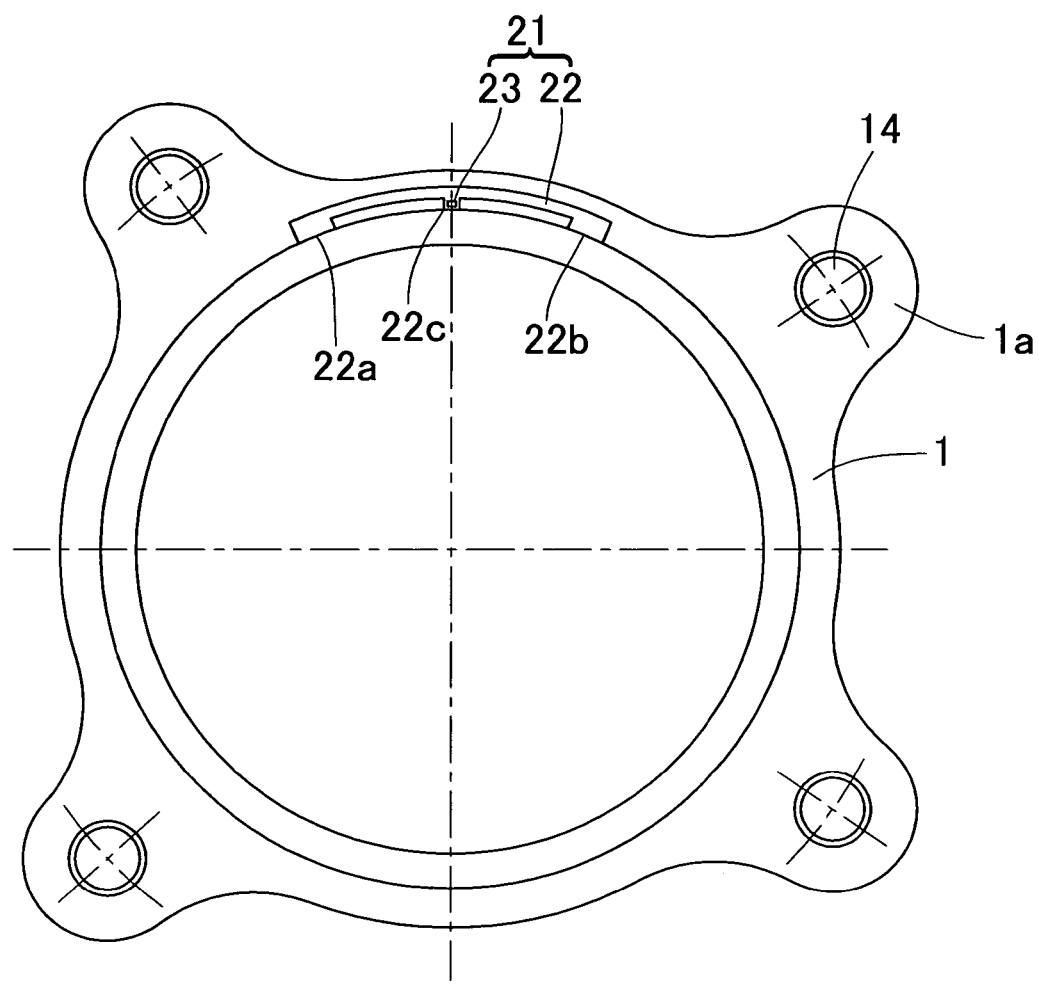
FIG. 15 is a front elevational view showing the outer member of the sensor incorporated wheel support bearing assembly and the sensor unit.
Figure 16A:
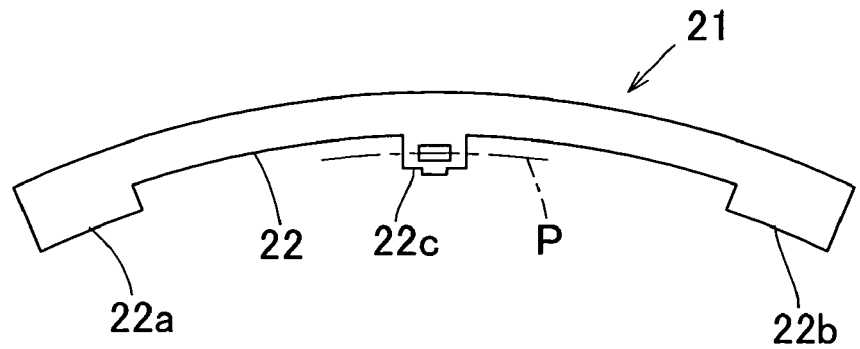
FIG. 16A is a front elevational view showing the sensor unit.
Figure 16B:
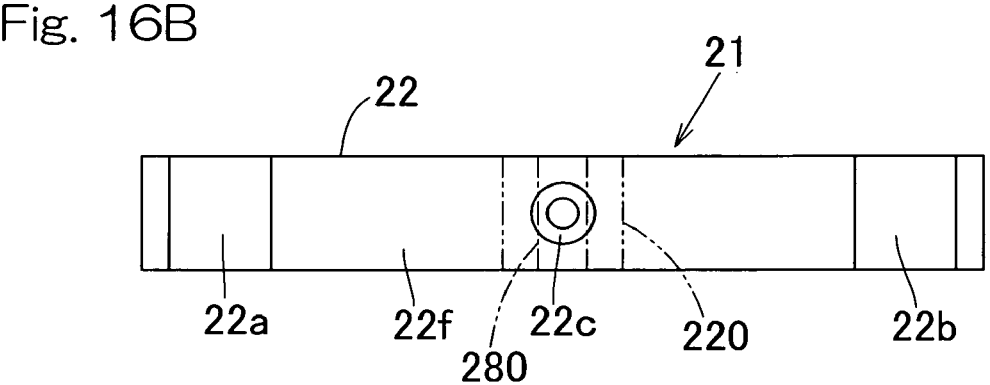
FIG. 16B is a bottom plan view thereof.

In the first example of application, as shown in FIGS. 15 and 16, the sensor mounting member 22 is rendered to be of a generally elongated arcuate configuration extending in a direction circumferentially thereof along the outer peripheral surface of the outer member 1, with contact fixing portions 22a, 22b and 22c formed at opposite ends thereof and an intermediate portion thereof so as to protrude radially inwardly of a curved surface thereof. The contact fixing portions 22a and 22b at the opposite ends of the sensor mounting member 22, respectively, have a rectangular sectional shape and also has a large sectional surface area, as can readily be understood from FIG. 16B, whereas the contact fixing portion 22c at the intermediate portion of the sensor mounting member 22 has a rectangular sectional shape and also has a small sectional surface area. The sectional shape referred previously is intended to means the shape observed when a cylindrical surface P (FIG. 16A) coaxial with the sensor mounting member 22 is cut. The intermediate contact fixing portion 22c has a throughhole 27 defined therein so as to extend in an axial direction, and an upper wall of the throughhole 27 is set to have a wall thickness t1 which is the same as that of the bridge portion 22f. The wall thickness t2 of a bottom wall 29 of the throughhole 27 is set to be smaller than the wall thickness t1 and the bottom wall 29 is provided at a circumferentially intermediate portion thereof with a contact leg 28 which protrudes radially inwardly to contact the outer peripheral surface of the outer member 1. This bottom wall 29 forms a fragile area where the rigidity is low. A pair of strain sensors 23 are fitted to a radially outer surface of the bottom wall (fragile area) 29 at respective locations spaced from the contact leg 28 in the intermediate contact fixing portion 22c of the sensor mounting member 22. In the case of this embodiment, the strain sensors 23 are so fitted by the use of a bonding agent. The sensor mounting member 22 has a sectional shape which is, for example, rectangular, but it may have any other suitable sectional shape. Since the strain sensors 23 are arranged on left and right sides of the contact leg 28, respectively, a large strain signal can be obtained by overlapping respective signals from those two strain sensors 23 with each other. It is to be noted that one of those strain sensors 23 may be dispensed with to thereby leave the other of the strain sensors 23.

The sensor unit 21 of the structure described above is fixed to the outer periphery of the outer member 1 through the contact fixing portions 22a, 22b and 22c of the sensor mounting member 22 by means of, for example, bonding with the use of a bonding agent with the longitudinal direction of such sensor mounting member 22 oriented in a direction confronting the circumference of the outer member 1. At this time, the intermediate contact fixing portion 22c is fixed so as to lie at the zenith position (directly above the road surface) on the entire circumference of the outer member 1 and the contact fixing portions 22a and 22b at the opposite ends of the sensor mounting member 22 are fixed so as to occupy respective positions spaced several dozens degrees downwardly from the zenith position. The zenith position is the circumferential position where the outer member 1 is most deformed in the radial direction by the effect of the load acting on the outer member 1 and each of the positions spaced several dozens degrees downwardly from the zenith position is the circumferential position where the outer member 1, when imposed with the above described load, undergoes little deformation. This has been clarified from the result of the FEM (Finite Element Method) analysis. It is to be noted that in the condition in which the sensor unit 21 is fitted to the outer member 1, any other portion of the sensor mounting member 22 than the contact fixing portions 22a, 22b and 22c is spaced from the outer peripheral surface of the outer member 1 to define a gap. Also, since the fragile portion is provided in the contact fixing portion 22c, the strain of the contact fixing portion 22c increases further and the accuracy of detection of the strain can be increased correspondingly.

As shown by the double dotted chain lines 220 in FIG. 16B, the intermediate contact fixing portion 22c may have a sectional shape which is about the same as that of any of the contact fixing portions 22a and 22b at the opposite ends of the sensor mounting member 22. In such case, the sectional shape of the contact leg 280 may be represent a rectangular shape having its longitudinal axis extending axially. Also, the use of the contact leg 28 may be dispensed with.

The sensor mounting member 22 referred to above has such a shape and is made of such a material that, when fitted to the outer member 1, the sensor mounting member 22 will not undergo any plastic deformation. Also, the sensor mounting member 22 must be of such a shape that the sensor mounting member 22 will not plastically deform even when a maximum expected load is applied to the wheel support bearing assembly. The maximum expected force referred to above is a maximum force imposed during the travel of the automotive vehicle that does not lead to a trouble in the automotive vehicle. The sensor mounting member 22 is so constructed as hereinabove described because if the sensor mounting member 22 deforms plastically, deformation of the outer member 1 will not be accurately transmitted to the sensor mounting member 22 with the strain measurement being adversely affected consequently.

For the strain sensors 23, any of various sensors can be employed. By way of example, strain gauge type sensors, optical fiber type sensors, pressure sensors or magnetostrictive type sensors can be suitably employed therefor. Where the strain sensors 23 are employed in the form of a magnetostrictive type sensor, the sensor mounting member 22 should be made of such a magnetostrictive material as having a negative magnetostrictive characteristic, for example, nickel or the like.

Also, the fragile area 29 may not be provided in the contact fixing portion 22c and, in such case, as shown in FIG. 16B, the intermediate contact fixing portion 22c has to have a sectional shape sufficiently smaller than that of any one of the contact fixing portions 22a and 22b at the opposite ends of the sensor mounting member 22 so that a relatively large strain can be generated in the contact fixing portion 22c and the sensors 23 may be fitted to a peripheral surface of the contact fixing portion 22c, for example, an axial end face thereof.

As shown in FIG. 14, as section for processing an output from each of the strain sensors 23, an estimation section 31 and an abnormality determining section 32 are employed in a manner similar to the first embodiment particularly shown in FIG. 1. Those sections 31 and 32 may be those provided in an electronic circuit device (not shown) such as, for example, a circuit substrate fitted to the outer member 1 or the like of the wheel support bearing assembly or those provided in an electronic control unit (ECU) of an automotive vehicle.

The operation of the wheel support bearing assembly of the structure hereinabove described will now be described. When a load is applied to the hub unit 9, the outer member 1 is deformed through the rolling elements 5 and such deformation is transmitted to the sensor mounting member 22 that is fitted to the outer member 1, resulting in deformation of the sensor mounting member 22. The strain of this sensor mounting member 22 is measured by the strain sensor 23. At this time, the sensor mounting member 22 deforms in accordance with deformation of that portion of the outer member 1, where the sensor mounting member 22 is fixed, in a radial direction. The zenith position of the outer member 1, where the intermediate contact fixing portion 22c of the sensor mounting member 22 is fixed, is the circumferential position at which the outer member 1 is most deformed in the radial direction by the load, and the respective positions at which the contact fixing portions 22a and 22b of the sensor mounting member 22 are fixed are the circumferential positions at which the outer member 1, when imposed with the load, undergoes little deformation. Accordingly, the contact fixing portion 22c, which tends to deform considerably in the radial direction, is further deformed about the fulcrum defined by each of the contact fixing portions 22a and 22b which undergo a small deformation in the radial direction. Also, since the intermediate contact fixing portion 22c has a lower rigidity than that at each of the contact fixing portions 22a and 22b, a more considerable strain appears at this area than that at any other areas. When this considerable strain of the contact fixing portion 22c is measured with the strain sensor 23, the strain of the outer member 1 can be detected with high sensitivity.

The axial position at which the sensor unit 21 is fitted to the outer member 1 is preferably on the outboard side of the outboard rolling surface 3 of the outer member 1 such as in this example of application. This is because if such axial position lies on the outboard side of the outboard rolling surface 3, the directionality of positive or negative occurs in the strain according to the direction of the load and the positive or negative direction of the load can be detected.

According to results of the FEM analysis and experiments, as far as the strain of the outer member 1 in both of radial and circumferential directions is concerned, only a portion of the outer member 1 on the outboard side has exhibited the directionality of positive or negative due to the positive or negative direction of the load such as, for example, the external force or the working force both referred to hereinbefore. Accordingly, in order to detect the positive or negative direction of the load, the sensor unit 21 is required to be arranged at a position of the outer member 1 on the outboard side.

Also, the sensor unit 21 is preferably provided on the peripheral surface of the outer member 1 such as in this example of application. Although the sensor unit 21 may be fitted to either an end face or a peripheral surface of the stationary member, fitting to the peripheral surface allows the deformation of the stationary member to be easily transmitted to the sensor mounting member and, accordingly, the strain of the stationary member can be detected with high sensitivity.

Since the manner of change of the strain varies depending on the direction and the magnitude of the load, by determining the relation between the strain and the load beforehand by means of a series of experiments and/or simulations, the external force acting on the wheel support bearing assembly or the working force between the vehicle tire and the road surface can be calculated. The estimation section 31 referred to previously is operable to calculate the external force acting on the wheel support bearing assembly or the working force between the vehicle tire and the road surface in reference to an output from the strain sensor 23 by the utilization of the relation between the strain and the load which has been determined by means of the experiments and/or simulations. The abnormality determining section 32 referred to previously is operable to output an abnormality signal to the outside when the unit 32 determines that the external force acting on the wheel support bearing assembly or the working force between the vehicle tire and the road surface, which has been calculated by the estimation section 31, exceeds a tolerance. This abnormality signal can be used in a vehicle control of the automotive vehicle. Also, when the external force acting on the wheel support bearing assembly or the working force between the vehicle tire and the road surface is detected in real time, a meticulous vehicle control can be carried out.

Also, although the wheel support bearing assembly has a preload applied by the inner member 2, the sensor mounting member 22 is deformed by such preload as well and, accordingly, if the relation between the strain and the preload is determined beforehand by means of a series of experiments and/or simulations, the amount of preload in the wheel support bearing assembly can also be calculated. The estimation section 31 calculates the amount of preload in the wheel support bearing assembly from the relation between the strain and the preload which has been determined by means of the experiments and/or simulations. Accordingly, the status of preload in the wheel support bearing assembly can be ascertained. Also, the preload can easily be adjusted at the time of assemblage of the wheel support bearing assembly.

Figure 17:
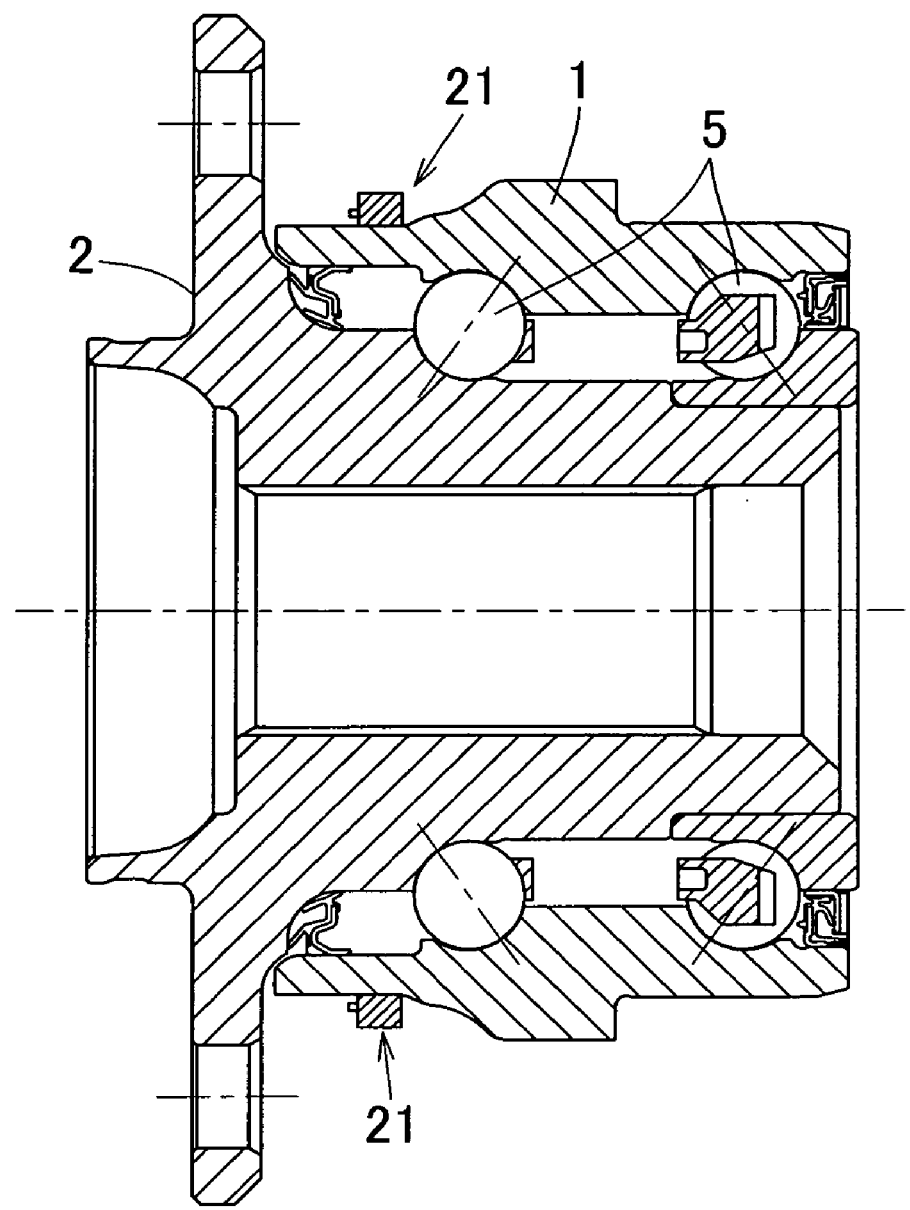
FIG. 17 is a sectional view showing the sensor incorporated wheel support bearing assembly according to a second example of application of the present invention.
Figure 18:
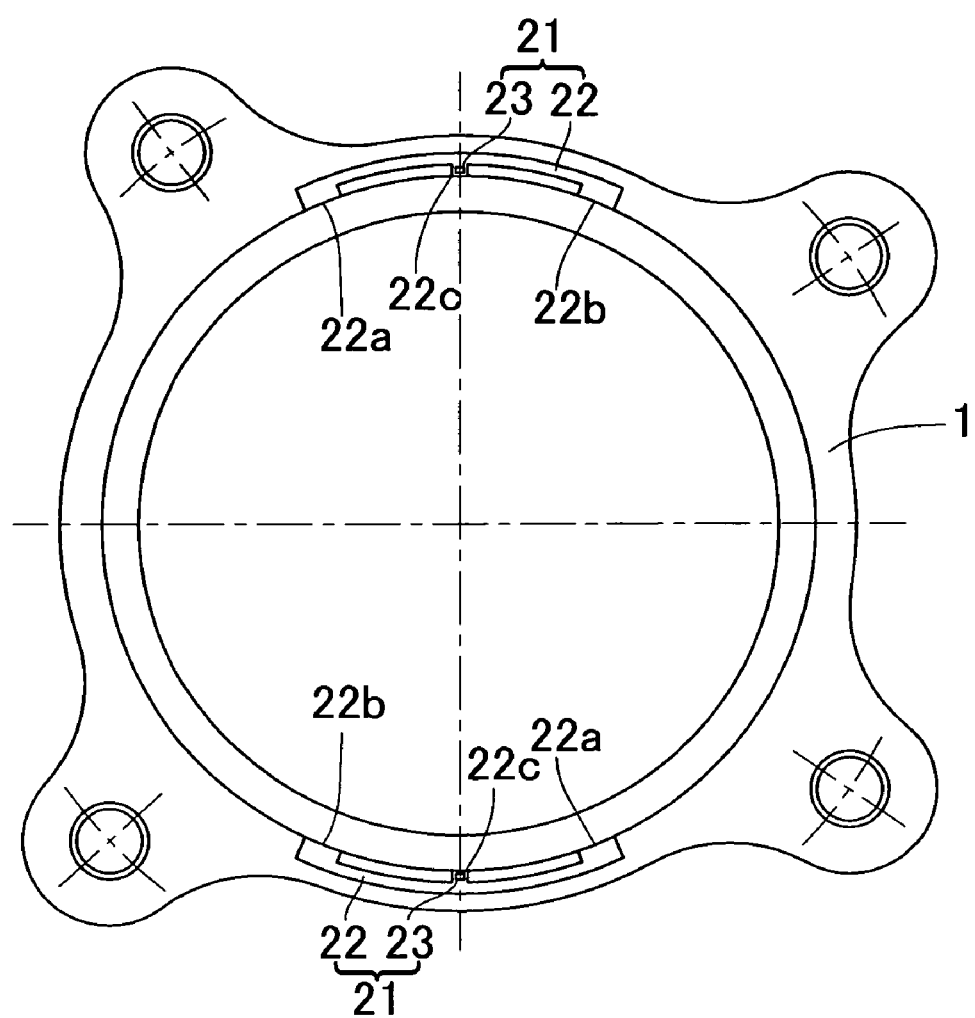
FIG. 18 is a front elevational view showing the outer member of the sensor incorporated wheel support bearing assembly and the sensor unit.

Although in this example of application, the sensor unit 21 has been shown and described as arranged at one location, the sensor unit 21 may be arranged at, for example, two or more locations as shown in FIG. 17 or FIG. 18. For example, where the sensor units 21 are provided at two locations, it is recommended that the positions, at which the contact fixing portions 22c, where the strain sensors 23 are fitted, are fixed to the outer member 1 have to be the zenith position and the position just below the zenith position, where the outer member, when imposed with the load acting on the outer member 1, is most deformed in the radial direction. When the sensor units 21 are employed at those two locations as hereinabove described, it is possible to achieve the detection of the load with further high accuracy.

The contact fixing portion 22c has a sectional shape considerably smaller than that of any one of the contact fixing portions 22a and 22b at the opposite ends of the sensor mounting member 22 so that the strain in the contact fixing portion 22c can have an increased magnitude, and the sensor 23 is fitted to an axial end face which forms a part of the peripheral surface of the contact fixing portion 22c.

Figure 19:
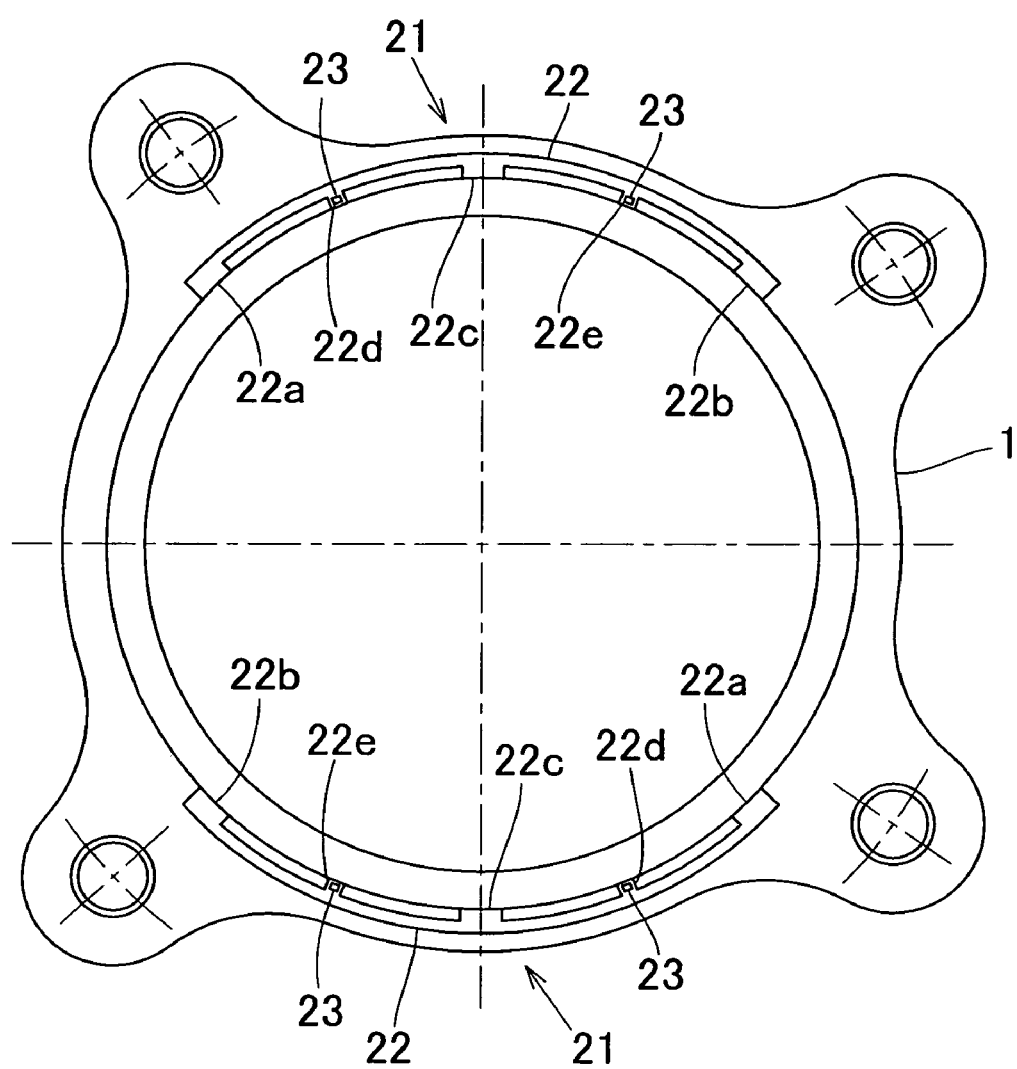
FIG. 19 is a front elevational view showing the outer member of the sensor incorporated wheel support bearing assembly according to a different example of the present invention and the sensor unit.

FIG. 19 illustrates a second example of application. The sectional diagram of the whole is identical with FIG. 17 and is not therefore illustrated. This example of application is so designed that two strain sensors 23 are provided in each of the single sensor unit 21. The sensor mounting member 22 of the sensor unit 21 has contact fixing portions 22a to 22e formed at five locations and, of them, the contact fixing portions 22a, 22b and 22c at the opposite ends and an intermediate portion of the sensor mounting member 22 have a large sectional surface area and the contact fixing portions 22d and 22e positioned intermediate between those contact fixing portions have a small sectional surface area. In the case of this example of application, the contact fixing portions 22d and 22e form fragile areas. The strain sensors 23 are fitted to the contact fixing portions 22d and 22e which serve as the fragile areas. When, as hereinabove described, the plural sensors 23 are provided in each of the sensor units 21, a highly accurate detection of the load can be accomplished. Even in this case, the sensor units 21 can be provided at two or more locations of the outer member 1.

Figure 20:
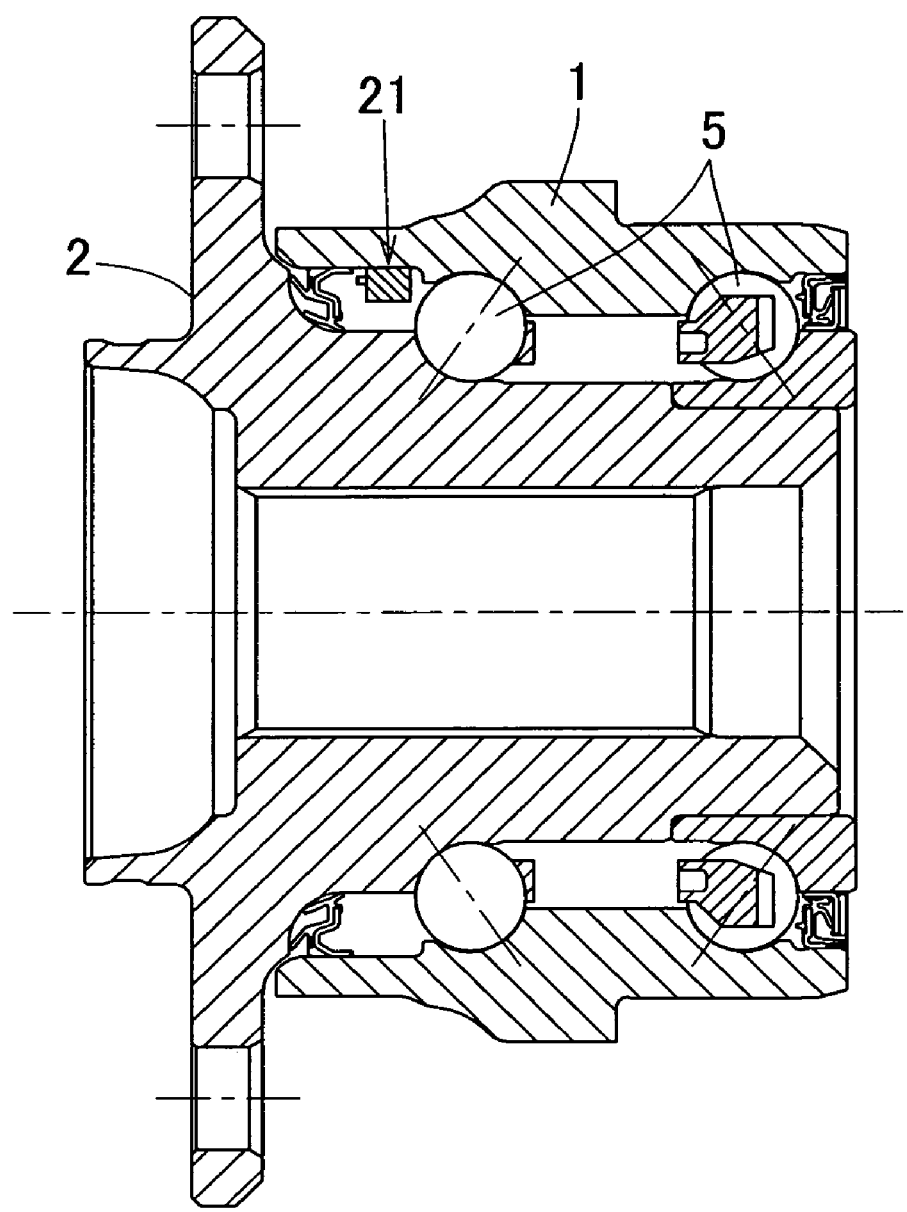
FIG. 20 is a sectional view showing the sensor incorporated wheel support bearing assembly according to a third example of application of the present invention.
Figure 21:
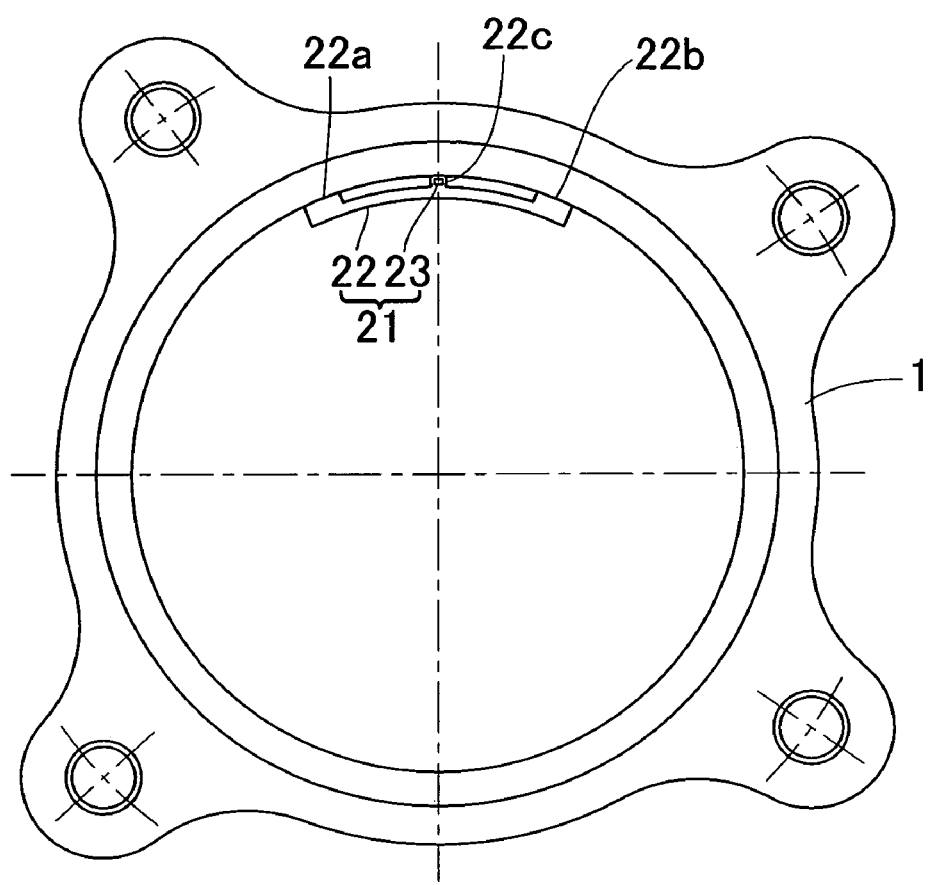
FIG. 21 is a front elevational view showing the outer member of the sensor incorporated wheel support bearing assembly and the sensor unit.

Also, where by reason of a space or the like, it is difficult to provide the sensor unit 21 in the outer periphery of the outer member 1, the sensor unit 21 may be provided in the inner periphery of the outer member 1 as shown in FIGS. 20 and 21.

It is to be noted that although in describing each of the foregoing examples of application, the outer member 1 has been shown and described as serving the stationary member, the present invention can be equally applied to the wheel support bearing assembly, in which the inner member 2 serves as the stationary member and, in such case, the sensor unit 21 is provided in the peripheral surface of the inner member 2.

Also, although the present invention has been shown and described as applied to the wheel support bearing assembly of the third generation type, the present invention can be equally applied to the wheel support bearing assembly of a first or second generation type, in which the bearing unit and the hub unit are component parts separate from each other and also to the wheel support bearing assembly of a fourth generation type, in which a part of the inner member is constituted by an outer ring of a constant velocity universal joint. Yet, the sensor incorporated wheel support bearing assembly of the present invention can be applied to that for the support of a vehicle driven wheel and also to the wheel support bearing assembly of any generation type utilizing tapered rollers.

Figure 16C:
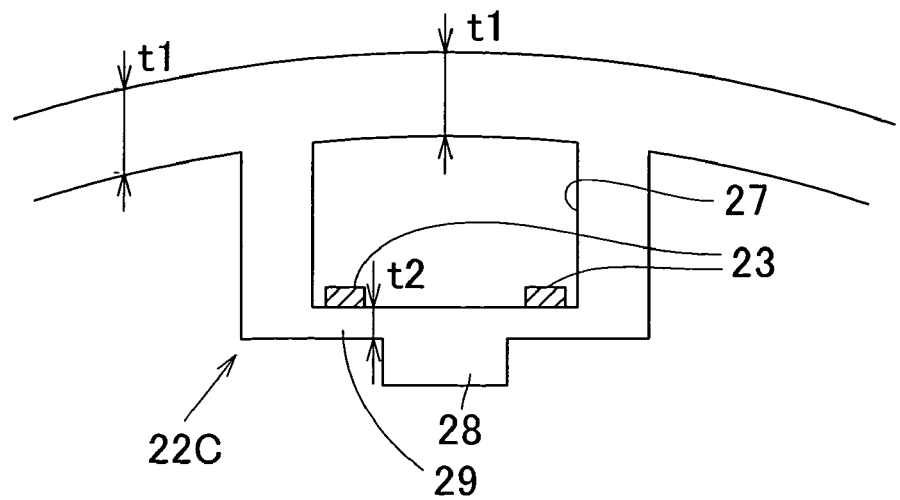
FIG. 16C is an enlarged front elevational view showing an important portion thereof.

In any one of the foregoing examples of application shown in and described with reference to FIGS. 17 to 21, a fragile area 29 similar to that shown in FIG. 16C may be provided in the intermediate contact fixing portion 22c and in such case, the contact fixing portion 22c can have a large sectional shape, for example, a sectional shape which is about the same as that of any one of the contact fixing portions 22a and 22b at the opposite ends of the sensor mounting member 22. Also, the sectional shape of the contact fixing portion 22c may be round as shown in FIG. 16B.

The foregoing examples of application shown in and described with reference to FIGS. 14 to 21 includes the following modes (1) to (13):

Mode of Application (1):

A wheel support bearing assembly for rotatably supporting a vehicle wheel relative to an automotive body structure includes an outer member having an inner periphery formed with double row rolling surfaces defined therein, an inner member formed with rolling surfaces in face-to-face relation with the rolling surfaces in the outer member, double row rolling elements interposed between those rolling surfaces, and a sealing device for sealing opposite ends of a bearing space between the outer member and the inner member, a sensor unit including a sensor mounting member and a strain sensor fitted to the sensor mounting member fitted to one of the outer member and the inner member, which serves as a stationary member, an estimation section for calculating, in reference to an output of the strain sensor of the sensor unit, an external force acting on the wheel support bearing assembly or a working force between the vehicle tire and the road surface or the amount of preload in the wheel support bearing assembly. The sensor mounting member has a plurality of contact fixing portions fixed at least two locations spaced from each other in a direction circumferentially of the stationary member, and the strain sensor is fitted to the contact fixing portion at least one location of the plural contact fixing portions.

In the event that a load acts on the rotatable member as the automotive vehicle starts traveling, the stationary member undergoes deformation through the rolling elements and such deformation brings about a strain in the sensor unit. The strain sensor provided in the sensor unit detects the strain occurring in the sensor unit. The estimation section calculates, in reference to an output of the strain sensor of this sensor unit, an external force acting on the wheel support bearing assembly or a working force between the vehicle tire and the road surface or the amount of preload in the wheel support bearing assembly. When a calculated value so obtained in the manner described above is utilized in a vehicle control of the automotive vehicle, a meticulous vehicle control can be accomplished.

The extent to which the stationary member is deformed in the radial direction by the effect of the external force or the working force referred to above varies depending on a location on the circumferential direction thereof. According to a result of analysis, deformation of the stationary member in the radial direction due to the axial load acting at contact point between the vehicle tire and the road surface is maximum at the zenith position and a position just below the zenith position. Accordingly, if the contact fixing portions of the sensor mounting member are positioned on at least two locations spaced from each other in a direction circumferentially of the stationary member, it is possible to bring radial deformation of different magnitudes on those contact fixing portions. In the sensor mounting member, the contact fixing portion susceptible to a large deformation in the radial direction undergoes a considerable deformation about the fulcrum defined by the contact fixing portion susceptible to a small deformation in the radial direction. Accordingly, if the strain sensor is fitted to the contact fixing portion susceptible to the large deformation in the radial direction, the strain occurring in the stationary member can be detected by the strain sensor with high sensitivity.

Since the wheel support bearing assembly is so designed that the sensor unit including the sensor mounting member and the strain sensor fitted to the sensor mounting member is fitted to the stationary member, the sensor for the detection of the load can be compactly installed in the automotive vehicle. Since the sensor mounting member is a handy component part that can be fitted to the stationary member, fitting the strain sensor thereto renders the mass productivity to be excellent and the cost can be reduced.

Mode of Application (2):

In the Mode of Application (1) above, of the plural contact fixing portions of the sensor mounting member, the contact fixing portion to which the strain sensor is fitted has a sectional shape smaller than that of any other contact fixing portion.

A more considerable deformation appears in the contact fixing portion having a reduced sectional shape than in any other contact fixing portion. Since the strain sensor detects this considerable deformation, it is possible to detect the strain in the contact fixing portion with further high sensitivity. Also, positioning of the sensor in the contact fixing portion allows the sensor to be positioned at the zenith position, which is a circumferential location at which the most considerable deformation occurs, and, therefore, the detecting accuracy can be increased further.

Mode of Application (3):

In the Mode of Application (1) above, the location at which the contact fixing portion, to which the strain sensor is fitted, is fixed to the stationary member is a circumferential location at which deformation in the radial direction occurs more considerably than that at any other location in the circumferential direction of the stationary member by the effect of the external force acting on the wheel support bearing assembly or the working force between the vehicle tire and the road surface.

As hereinbefore described, fitting the strain sensor to the contact fixing portion at which the considerable deformation in the radial direction occurs is effective to allow this strain sensor to detect the strain in the stationary member with high sensitivity.

Mode of Application (4):

In the Mode of Application (1) above, the sensor unit is employed in a plural number.

When the plural sensor units are provided at a plurality of locations of the stationary member, deformation occurring at various parts of the stationary member can be detected and, therefore, detailed information on the strain in the stationary member can be obtained.

Mode of Application (5):

In the Mode of Application (1) above, the sensor unit referred to above is fitted to an outboard portion of the stationary member, for example, a position of the stationary member on the outboard side of the outboard rolling surface.

According to the result of analysis and experiments, both of the deformations occurring in the radial and peripheral directions have exhibited having the directionality of positive and negative due to the positive or negative of the load such as the external force referred to above or the working force referred to above at only an outboard portion of the outer member. Accordingly, in order to detect the positive or negative direction of the load, it is necessary to position the sensor unit at the position on the outboard side of the stationary member.

Mode of Application (6):

In the Mode of Application (1) above, the sensor unit is provided in a peripheral surface of the stationary member.

Although the sensor unit may be fitted to either the peripheral surface of the stationary member or the end face thereof, fitting the sensor unit to the peripheral surface is effective to allow the deformation of the stationary member to be readily transmitted to the sensor mounting member and, therefore, the strain in the stationary member can be detected with high sensitivity.

Mode of Application (7):

In the Mode of Application (1) above, even in a condition in which as the external force acting on the stationary member or the working force acting between the vehicle tire and the road surface, the maximum expected force is applied, the sensor mounting member of the sensor unit does not undergo a plastic deformation. The maximum expected force is a maximum force expected during the travel which does not lead to a trouble in the automotive vehicle.

If the plastic deformation occurs in the sensor unit, the deformation of the stationary member will not be transmitted accurately to the sensor mounting member of the sensor unit and the measurement of the strain will be adversely affected. In order to avoid this, the sensor mounting member is so designed that no plastic deformation occurs in the sensor mounting member.

Mode of Application (8):

In the Mode of Application (1) above, the strain sensor is in the form of one of the strain gauge type sensor, the optical fiber type sensor, the pressure sensor and the magnetostrictive type sensor.

In the case where the strain sensor is in the form of the magnetostrictive type sensor, a material for the sensor mounting member is a magnetostrictive material having a negative magnetostrictive characteristic such as, for example, nickel or the like.

Mode of Application (9):

In the Mode of Application (1) above, the stationary member is the outer member. In such case, the sensor unit is fitted to the outer member.

Mode of Application (10):

In the Mode of Application (1) above, the strain sensor is the pressure sensor.

Mode of Application (11):

In the Mode of Application (1) above, the strain sensor is the magnetostrictive sensor.

Mode of Application (12):

In the Mode of Application (11) above, a material for the sensor mounting member is a magnetostrictive material having a negative magnetostrictive characteristic such as, for example, nickel or the like.

Mode of Application (13):

In the Mode of Application (1) above, the stationary member is the outer member.

Mode of Application (14):

In the Mode of Application (1) above, at least contact fixing portion has a fragile area and the strain sensor is fitted to this fragile area.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, such change or modification includes the use of a sensor for detecting the deformation, which is quite different from that employed in any one of the foregoing embodiments.

Accordingly, such changes and modifications are, unless they depart from the scope of the present invention as delivered from the claims annexed hereto, to be construed as included therein.

What is claimed is:

1. A sensor incorporated wheel support bearing assembly for rotatably supporting a vehicle wheel relative to an automotive body structure, which assembly comprises:

an outer member having an inner periphery formed with double row rolling surfaces defined therein, an inner member formed with rolling surfaces in face-to-face relation with the rolling surfaces in the outer member, a plurality of rows of rolling elements interposed between those rolling surfaces; and a sensor unit mounted on one of the outer member and the inner member, which is a stationary member, the sensor unit including a sensor mounting member and a strain sensor fitted to the sensor mounting member;

in which the sensor mounting member has a plurality of contact fixing portions that are fixed to at least two locations spaced from each other in a direction circumferentially of the stationary member;

in which a cutout is provided in the stationary member at least one location, corresponding to an intermediate portion between the plural neighboring contact fixing portions of the sensor mounting member, so as to extend in a direction axially thereof; and in which the strain sensor is arranged at least one location intermediate between the neighboring contact fixing portions.

2. The sensor incorporated wheel support bearing assembly as claimed in claim 1, wherein at least one of the contact fixing portions is fitted to a circumferential location which deforms more considerably than any other location in a circumferential direction of the stationary member by an effect of an external force acting on the stationary member or a working force between a vehicle tire and a road surface.

3. The sensor incorporated wheel support bearing assembly as claimed in claim 1, wherein the sensor unit is fitted to an outboard portion of the stationary member.

4. The sensor incorporated wheel support bearing assembly as claimed in claim 1, wherein the sensor unit is provided in an outer peripheral surface of the stationary member.

5. The sensor incorporated wheel support bearing assembly as claimed in claim 1, wherein a plurality of sensor units are employed.

6. The sensor incorporated wheel support bearing assembly as claimed in claim 1, further comprising an estimation section, operable in response to an output from the strain sensor, for calculating an external force acting on the wheel support bearing assembly or a working force between a vehicle tire and a road surface or an amount of preload in the wheel support bearing assembly.

7. The sensor incorporated wheel support bearing assembly as claimed in claim 1, further comprising a temperature sensor provided in the sensor mounting member.

8. The sensor incorporated wheel support bearing assembly as claimed in claim 1, further comprising at least one of an acceleration sensor and a vibration sensor, which is provided in the sensor mounting member.

9. The sensor incorporated wheel support bearing assembly as claimed in claim 1, wherein the strain sensor includes an insulating layer formed on a surface of the sensor mounting member by means of printing and baking, and electrodes and a strain measuring resistance element formed on the insulating layer by means of printing and baking.

10. The sensor incorporated wheel support bearing assembly as claimed in claim 1, further comprising a sensor signal processing circuit unit including a sensor signal processing circuit for processing an output signal of the strain sensor, which unit is fitted to the stationary member in proximity to the sensor unit.

* * * * *

UNITED STATES PATENT AND TRADEMARK OFFICE
CERTIFICATE OF CORRECTION

| | |
|---|---|
| PATENT NO. | : 7,762,128 B2 |
| APPLICATION NO. | : 12/224802 |
| DATED | : July 27, 2010 |
| INVENTOR(S) | : Takayoshi Ozaki et al. |

It is certified that error appears in the above-identified patent and that said Letters Patent is hereby corrected as shown below:

Column 22, Line 65 after "member" insert --at--.

Column 23, Line 3 after "arranged" insert --at--.

Signed and Sealed this
Seventh Day of June, 2011

David J. Kappos
*Director of the United States Patent and Trademark Office*